(12) United States Patent
Wheat et al.

(10) Patent No.: US 6,759,156 B1
(45) Date of Patent: Jul. 6, 2004

(54) OPERATING STATES FOR FUEL PROCESSOR SUBSYSTEMS

(75) Inventors: W. Spencer Wheat, Missouri City, TX (US); Vesna R. Mirkovic, Pearland, TX (US); Hugh N. To, Houston, TX (US); Dennis J. Benedetto, Spring, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 10/407,482

(22) Filed: Apr. 4, 2003

(51) Int. Cl.$^7$ .............................. H01M 8/04; C01B 3/24

(52) U.S. Cl. ............................ 429/19; 429/17; 429/20; 429/22; 423/650; 423/652

(58) Field of Search ............................ 429/17, 19, 20, 429/22; 423/650, 652

(56) References Cited

U.S. PATENT DOCUMENTS

| | | | |
|---|---|---|---|
| 4,673,624 A | | 6/1987 | Hockaday |
| 5,731,101 A | | 3/1998 | Sherif et al. |
| 5,827,602 A | | 10/1998 | Koch et al. |
| 6,306,531 B1 | * | 10/2001 | Clingerman et al. .......... 429/19 |
| 6,376,112 B1 | * | 4/2002 | Clingerman et al. .......... 429/17 |
| 6,383,670 B1 | * | 5/2002 | Edlund et al. ................ 429/20 |
| 6,436,561 B1 | * | 8/2002 | Hart-Predmore et al. ..... 429/12 |
| 2002/0083646 A1 | | 7/2002 | Deshpande et al. |
| 2002/0088740 A1 | | 7/2002 | Krause et al. |
| 2002/0090326 A1 | | 7/2002 | Deshpande |
| 2002/0090327 A1 | | 7/2002 | Deshpande |
| 2002/0090328 A1 | | 7/2002 | Deshpande |
| 2002/0090334 A1 | | 7/2002 | Stevens et al. |
| 2002/0094310 A1 | | 7/2002 | Krause et al. |
| 2002/0098129 A1 | | 7/2002 | Martin et al. |
| 2002/0155329 A1 | | 10/2002 | Stevens |

OTHER PUBLICATIONS

Suarez et al., "Synthesis and physical–chemical properties of ionic liquids based on 1–n–butyl–3–methylimidazolium cation," *J. Chim. Phys.* 95:1626–1639 (1998).
Wilkes et al., "Air and Water Stable 1–Ethyl–3–methylimidazolium Based Ionic Liquids," *J. Chem. Soc., Chem. Commun.* 965–967 (1992).
Fannin, Jr. et al., "Properties of 1,3–Dialkylimidazolium Chloride—Aluminum Chloride Ionic Liquids. 2. Phase Transitions, Densities, Electrical Conductivities, and Viscosities," *J. Phys. Chem.* 88:2614–2621 (1984).
Fuller et al., "Structure of 1–Ethyl–3–methylimidazolium Hexafluorophosphate: Model for Room Temperature Molten Salts," *J. Chem. Soc., Chem. Commun.* 299–300 (1994).
Bowlas et al., "Liquid–crystalline ionic liquids," *Chem. Commun.* 1625–1626 (1996).
Bonhôte et al., "Hydrophobic, Highly Conductive Ambient–Temperature Molten Salts," *Inorg. Chem.* 35:1168–1178 (1996).

* cited by examiner

*Primary Examiner*—Hoa Van Le
(74) *Attorney, Agent, or Firm*—Williams, Morgan & Amerson; Frank C. Turner

(57) ABSTRACT

An operational cycle for a fuel processor capable of reforming a fuel, the operational cycle is disclosed. The operational cycle includes: an off state; a manager check state entered into from the off state, and in which the operational readiness of the fuel processor is checked; a preheat state entered into from the manager check state, and in which the fuel processor preheats gases, including the fuel, for mixing into a process feed stream; a startup state entered into from the preheat state, and in which the fuel processor begins operating under start-up conditions; a run state entered into from the startup state, and in which the fuel processor reforms the process feed stream into a reformate under steady-state conditions; and a shutdown state entered into any one of the manager check state, preheat state, startup state, and run state. The operational cycle may be employed in a fuel processor for a fuel cell or a fuel cell power plant.

67 Claims, 14 Drawing Sheets

OPERATING STATES FOR FUEL PROCESSOR SUBSYSTEMS

BACKGROUND OF THE INVENTION

1. Field of the Invention

The present invention is directed to a fuel processor, and, more particularly, to a control system for a fuel processor.

2. Description of the Related Art

Fuel cell technology is an alternative energy source for more conventional energy sources employing the combustion of fossil fuels. A fuel cell typically produces electricity, water, and heat from a fuel and oxygen. More particularly, fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of "fuel processors" or "reformers" to convert the hydrocarbons to a hydrogen rich gas stream which can be used as a feed for fuel cells. Hydrocarbon-based fuels, such as natural gas, LPG, gasoline, and diesel, require conversion for use as fuel for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Thus, many types of fuels can be used, some of them hybrids with fossil fuels, but the ideal fuel is hydrogen. If the fuel is, for instance, hydrogen, then the combustion is very clean and, as a practical matter, only the water is left after the dissipation and/or consumption of the heat and the consumption of the electricity. Most readily available fuels (e.g., natural gas, propane and gasoline) and even the less common ones (e.g., methanol and ethanol) include hydrogen in their molecular structure. Some fuel cell implementations therefore employ a "fuel processor" that processes a particular fuel to produce a relatively pure hydrogen stream used to fuel the fuel cell.

The operation of fuel processors and fuel cells, however, is highly complicated. The complexity arises from not only the sophistication of the reforming process and the operation of the fuel cell, but also because the fuel processor and fuel operations are typically highly interrelated. Changes in operating conditions in parameters in one or the other of the fuel processor and fuel cell frequently cascade changes in the other, for good or ill. Sometimes these changes happen relatively rapidly, even for the automated controller such power plants (i.e., the fuel processor and fuel cell) typically use. The complexity and interrelatedness of the operations typically generate a lot of data that the automated controller must deal with quickly. Thus, the organization and efficiency of the data management by the automated controller becomes paramount.

The present invention is directed to resolving, or at least reducing, one or all of the problems mentioned above.

SUMMARY OF THE INVENTION

The invention comprises an operational cycle for a fuel processor capable of reforming a fuel, the operational cycle including: an off state; a manager check state entered into from the off state, and in which the operational readiness of the fuel processor is checked; a preheat state entered into from the manager check state, and in which the fuel processor preheats gases, including the fuel, for mixing into a process feed stream; a startup state entered into from the preheat state, and in which the fuel processor begins operating under start-up conditions; a run state entered into from the startup state, and in which the fuel processor reforms the process feed stream into a reformate under steady-state conditions; and a shutdown stale entered into any one of the manager check state, preheat state, startup state, and run state. In other aspects, the operational cycle is employed in a fuel processor for a fuel cell and a fuel cell power plant.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
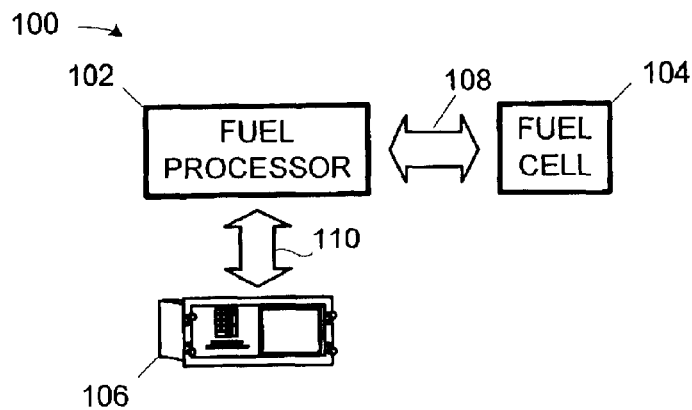
FIG. 1 conceptually illustrates a fuel cell power plant employing a fuel processor constructed and operated in accordance with the present invention.

FIG. 1 conceptually illustrates a fuel cell power plant 100 including a fuel processor 102, a fuel cell 104, and an automated control system 106. The fuel processor 102 is, in the illustrated embodiment, a self-contained auto-thermal reforming ("ATR") fuel processor that converts pipeline-quality natural gas to fuel cell grade fuel. Thus, the power plant 100 is a natural gas power plant, although the invention may be practiced with alternative fuels and end applications. In the illustrated embodiment, the fuel cell 104 is a conventional Proton Exchange Membrane Fuel Cell ("PEMFC"), also known as a Polymer Electrolyte Fuel Cell ("PEFC"). However, other types of fuel cells may be used. Note also that the fuel processor 102 is not limited to use with fuel cells, e.g., the fuel cell 104. Product gas of the reformate 108 may be used as the feed for a fuel cell, as shown, or for other applications where a hydrogen rich feed stream is desired. Optionally, product gas may be sent on to further processing, for example, to remove the carbon dioxide, water or other components. Thus, the invention is not limited to use in fuel cell power plants or even in power plants.

As previously mentioned, the fuel in the illustrated embodiment is natural gas, but may be some other type of hydrocarbon. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The operation of the fuel processor 102 and the fuel cell 104 are inter-related in the illustrated embodiment. The fuel processor 102 provides a hydrogen-rich effluent stream, or "reformate," as indicated by the graphic 108, to the fuel cell 104. The reformate 108, in the illustrated embodiment, includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream). Note, however, that the precise composition of the reformate 108 is implementation specific and not material to the practice of the invention.

The automated control system 106 controls the operation of the fuel processor 102, as indicated by the graphic 110. In some embodiments, the automated control system 106 may control the operation of the fuel cell 104 in addition to the fuel processor 102. The automated control system 106 is largely implemented in software on a computing apparatus, such as the rack-mounted computing apparatus 200 illustrated in FIG. 2A and FIG. 2B. Note that the computing apparatus 200 need not be rack-mounted in all embodiments. Indeed, this aspect of any given implementation is not material to the practice of the invention. The computing apparatus 200 may be implemented as a desktop personal computer, a workstation, a notebook or laptop computer, an embedded processor, or the like.

Figure 2A:
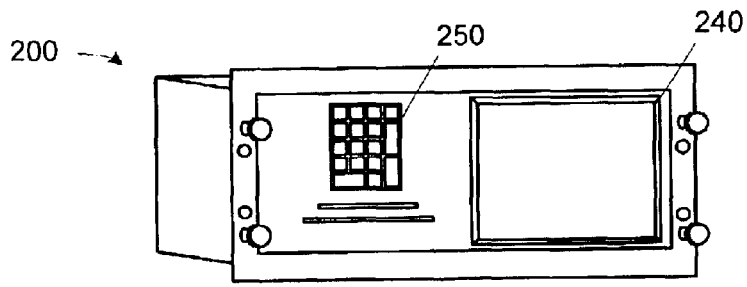
FIG. 2A and FIG. 2B conceptually illustrate a computing apparatus with which the automated control system of the embodiment of FIG. 1 may be implemented.
Figure 2B:
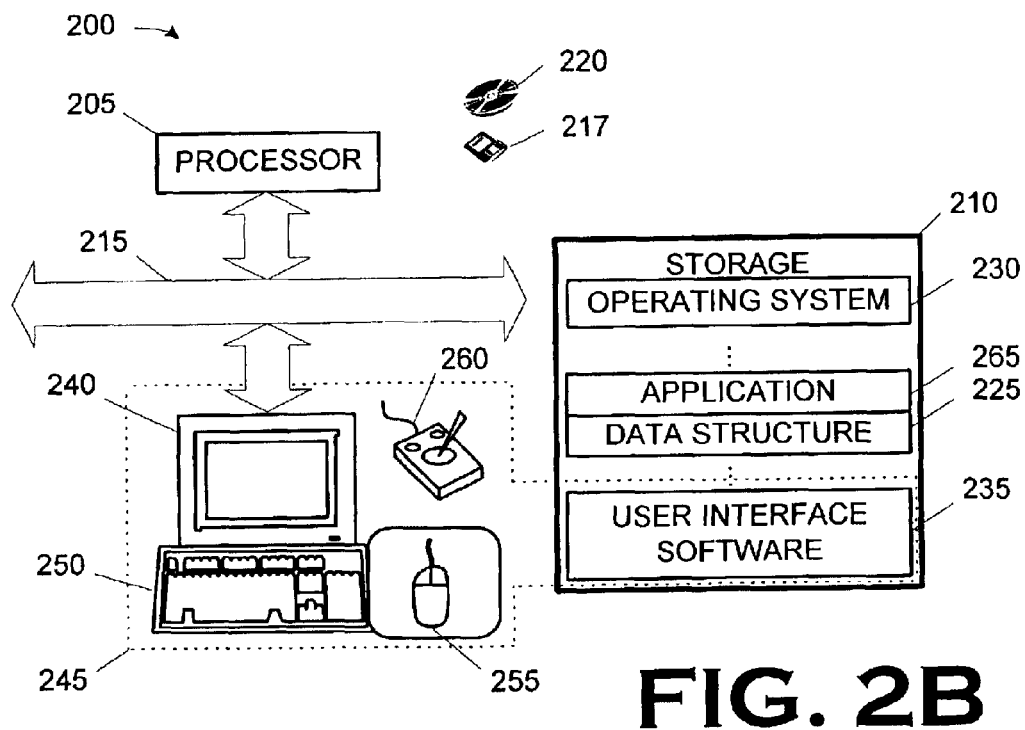

The computing apparatus 200 illustrated in FIG. 2A and FIG. 2B includes a processor 205 communicating with storage 210 over a bus system 215. The storage 210 may include a hard disk and/or random access memory ("RAM") and/or removable storage such as a floppy magnetic disk 217 and an optical disk 220. The storage 210 is encoded with a data structure 225 storing the data set acquired as discussed above, an operating system 230, user interface software 235, and an application 265. The user interface software 235, in conjunction with a display 240, implements a user interface 245. The user interface 245 may include peripheral I/O devices such as a key pad or keyboard 250, a mouse 255, or a joystick 260. The processor 205 runs under the control of the operating system 230, which may be practically any operating system known to the art. The application 265 is invoked by the operating system 230 upon power up, reset, or both, depending on the implementation of the operating system 230. In the illustrated embodiment, the application 265 includes the control system 100 illustrated in FIG. 1.

Thus, at least some aspects of the present invention will typically be implemented as software on an appropriately programmed computing device, e.g., the computing apparatus 200 in FIG. 2A and FIG. 2B. The instructions may be encoded on, for example, the storage 210, the floppy disk 217, and/or the optical disk 220. The present invention therefore includes, in one aspect, a computing apparatus programmed to perform the method of the invention. In another aspect, the invention includes a program storage device encoded with instructions that, when executed by a computing apparatus, perform the method of the invention.

Some portions of the detailed descriptions herein may consequently be presented in terms of a software-implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Figure 3:
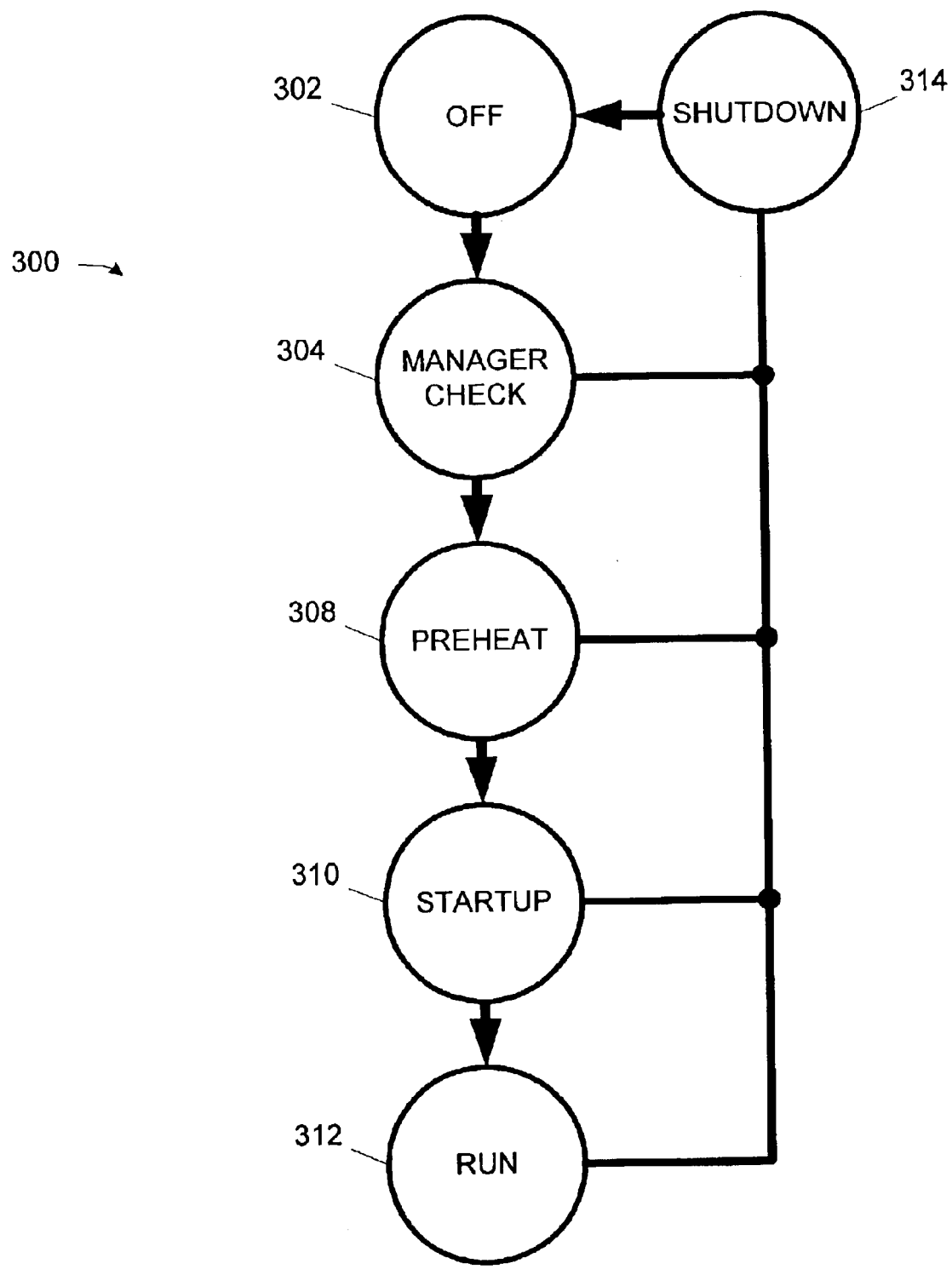
FIG. 3 illustrates an operational cycle in accordance with the present invention for the fuel processor shown in FIG. 1.

Returning now to FIG. 1, the automated control system 106 implements an operational cycle 300, shown in FIG. 3, governing the operation of the fuel processor 102. More particularly, in order to manage the various steps in operating, starting and shutting down the fuel processor 102, the operational cycle 300 is segregated into a plurality of operational states. The operational states mimic the operation of the reactor, and permit an organization or hierarchical architecture for the controls. In the illustrated embodiment, the states are defined in light of the following tenets:

- all states continuously monitor active diagnostics;
- all states receive notification to advance from one state to the next;
- all states meet conditional statements to advance from one state to the next;
- states do not skip the next state or return back to a previous state without passing through the shutdown state and the off state (both discussed-further below);
- all states have a path to the shut down state, and then the off state;
- each of these described states may contain a multitude of sub-states to initialize components and sections of the fuel processor 102 as needed, preventing the operation of other devices until necessary; and
- operations performed in the off state vary as a function of the preceding state.

Note that other design tenets may be used in addition to or in lieu of those set forth above in alternative embodiments.

In light of these design tenets, the following states shown in FIG. 3, are implemented in the illustrated embodiment:

- an off state 302—the first state in the sequence of operation. The off state 302 prepares the hardware of the fuel processor 102 to its normally open or normally closed position, i.e., the resulting position when not energized. As shown in FIG. 3, the fuel processor 102 originates in to the off state when the previously described controller initializes or enters this state from the shutdown state 314 (discussed further below).
- a manager check state 304—the second state in the sequence of operation and entered into from the off state 302. The manager check state 304 checks for the readiness of the fuel processor 102 to start-up. In the manager check state 304, the reactor balance of the power plant 100 is manipulated to validate that specific conditionals prerequisite to operation are met.
- a preheat state 308—the third state in the sequence of operations and entered into from the manager check state 304. The preheat state 308 initiates and manages the stable operation of the oxidizer 404, shown in FIG. 6, and uses the heat generated from the tail gas combustor to preheat input gases for a process feed stream that will be reformed by the fuel processor 102.
- a startup state 310—the fourth state in the sequence of operation and entered into from the preheat state 308. The startup state 310 begins operation of the fuel processor 102 under start-up conditions and prepares the fuel processor 102 for operation in the run state 312.
- a run state 312—the fifth state in the sequence of operation and entered into from the startup state 310. In the run state 312, the fuel processor 102 is managed to reform input gases into the hydrogen-rich reformate 108.
- a shutdown state 314 in which the physical subsystems of the power plant 100 shut down their operation, and into which the fuel processor 102 can transition from any of the other states 304, 208, 310, and 312.

Note that additional states may be employed in alternative embodiments. Note also that, in some alternative embodiments, one or more of the operational states 302–314 may be combined or further segregated. For instance, the manager check state 304 and the preheat state 308 may be combined into a single, pre-startup operational state.

As previously mentioned, the operational states 302–314 receive notification to advance from one state to the next, all states meet conditional statements to advance from one state to the next, and states do not skip the next state or return back to a previous state. In the illustrated embodiment, the automated control system 106 enforces this protocol. The automated control system 106 generates and receives signals to and from the various components of the fuel processor 102 as a function of the allowed operation dictated in each state. The components perform whatever tasks are designated for that particular state, and signal the automated control system 106 of their condition through associated sensors and feedback mechanisms.

As soon as all the components have signaled their completion of that particular stage, the automated control system 106 initiates a new set of commands as a function of the next state of operation. The activities associated with each component of the fuel processor 102 and the conditions that must be satisfied to transition to the next state will vary by the status of the process and the resulting state. The automated control system 106 and the fuel processor 102 progress through the states as described above and shown in FIG. 3 until the automated control system 106 or described input devices signal a transition to the shutdown state 314. Thus, in the illustrated embodiment, each of the operational states is discrete from the others and the transition of the components through the various operational states is synchronized.

Figure 4:
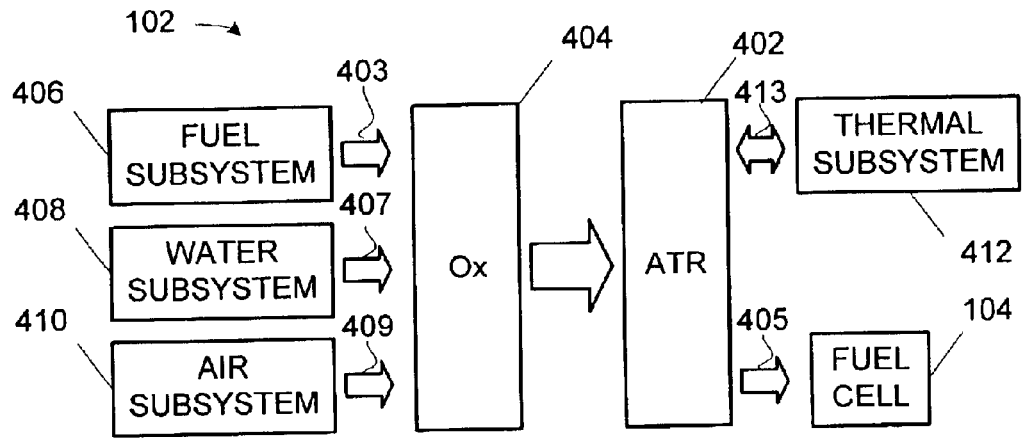
FIG. 4 illustrates one particular embodiment of the fuel processor of the power plant in FIG. 1 operated and controlled in accordance with the present invention.
Figure 5:
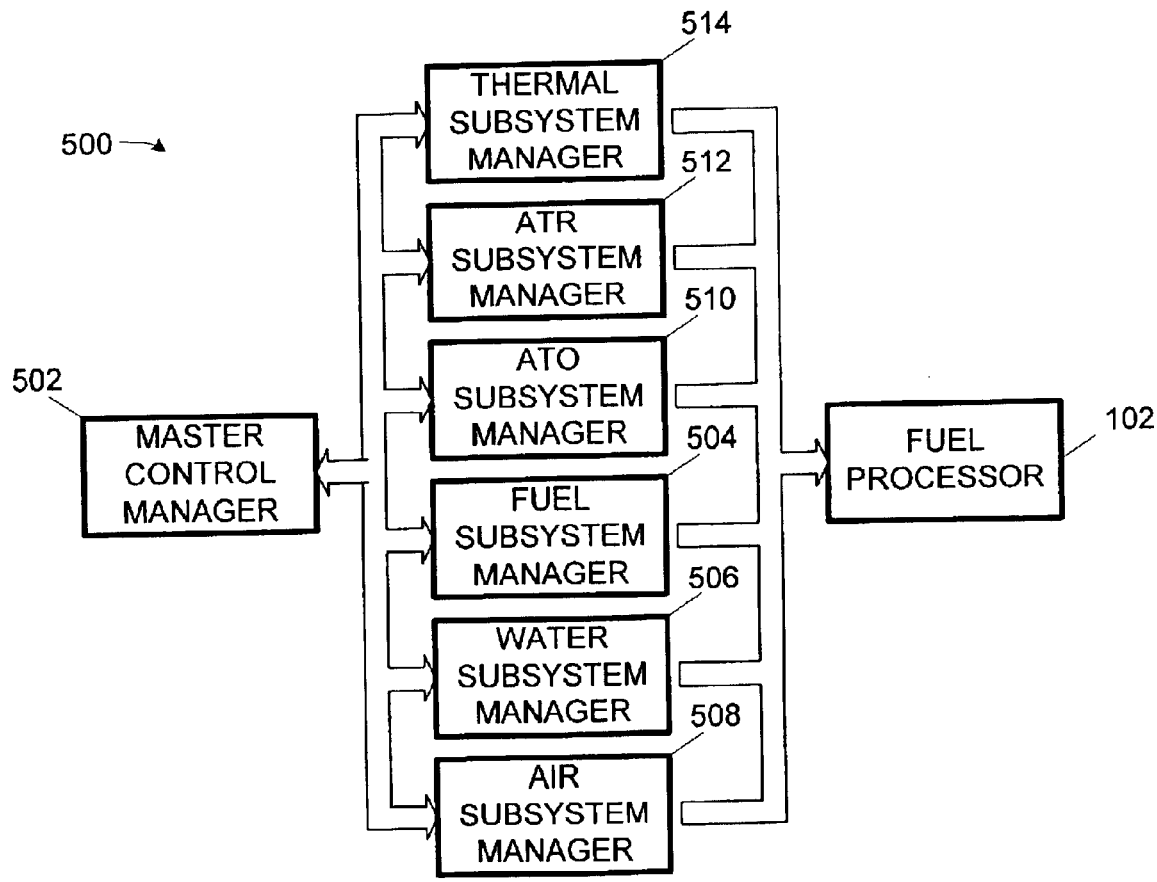
FIG. 5 depicts one particular embodiment of the automated control system of FIG. 1 for use in controlling the fuel processor first shown in FIG. 1.

To further an understanding of the present invention, one particular implementation of the illustrated embodiment will now be disclosed. The fuel processor 102 is implemented as shown in FIG. 4, which also shows the fuel cell 104. The hardware side of the automated control system 106 is implemented as shown in FIG. 2A and FIG. 2B and discussed above. The software side of the automated control system 106 is implemented as shown in FIG. 5, which implements the operational cycle shown in FIG. 6.

Turning now to FIG. 4, the fuel processor 102 of the illustrated embodiment comprises several modular physical subsystems, namely:

- an autothermal reformer ("ATR") 402 that performs the oxidation-reduction reaction that reforms a fuel 403 input to the fuel processor 102 into a reformate 405 for a fuel cell 104;
- an oxidizer ("Ox") 404, which is an anode tailgas oxidizer ("ATO") in the illustrated embodiment, that mixes water 407, fuel 403, and air 409 to create a fuel mixture, or "process feed stream", 411 delivered to the ATR 402;
- a fuel subsystem 406, that delivers an input fuel 403 (natural gas, in the illustrated embodiment) to the ATO 404 for mixing into the process feed stream 411 delivered to the ATR 402;

a water subsystem 408, that delivers the water 407 to the ATO 404 for mixing into the process feed stream 411 delivered to the ATR 402;

an air subsystem 410, that delivers air 409 to the ATO 404 for mixing into the process feed stream 411 delivered to the ATR 402; and a thermal subsystem 412, that controls temperatures in the operation of the ATR 402 by circulating a coolant 413 therethrough.

Still referring to FIG. 4, the automated control system 106, in the illustrated embodiment, controls the operation of the ATR 402, oxidizer 404, fuel subsystem 406, water subsystem 408, air subsystem 410, and thermal subsystem 412 through a hierarchical control system 500, shown in FIG. 5, comprising:

a master control manager 502 that manages the control of the fuel processor 102 through the subsystem managers set forth below;

a fuel subsystem manager 504 that controls the delivery of the fuel 403 from the fuel subsystem 406 to the ATO 404 for mixing into the process feed stream 411 delivered to the ATR 402;

a water subsystem manager 506 that controls delivery of water 407 from the water subsystem 408 to the ATO 404 for mixing into the process feed stream 411 delivered to the ATR 402;

an air subsystem manager 508 that controls delivery of air 409 from the air subsystem 410 to the ATO 404 for mixing into the process feed stream 411 delivered to the ATR 402;

an ATO subsystem manager 510 that controls the mixing of steam from the water 407, fuel 403, and air 409 to create the process feed stream 411 delivered to the ATR 402 for reforming;

an ATR subsystem manager 512 that controls the oxidation-reduction reaction in the ATR 402 that reforms the fuel 403 input to the fuel processor 102 into the reformate 405 for the fuel cell 104; and a thermal subsystem manager 514 that controls temperatures in the operation of the ATR 402 and the ATO 404 through the thermal subsystem 412.

Thus, each of the subsystem managers 504–514 controls the operation of a respective physical subsystem 402–412 of the fuel processor 102 under the direction of the master control manager 502.

Figure 6:
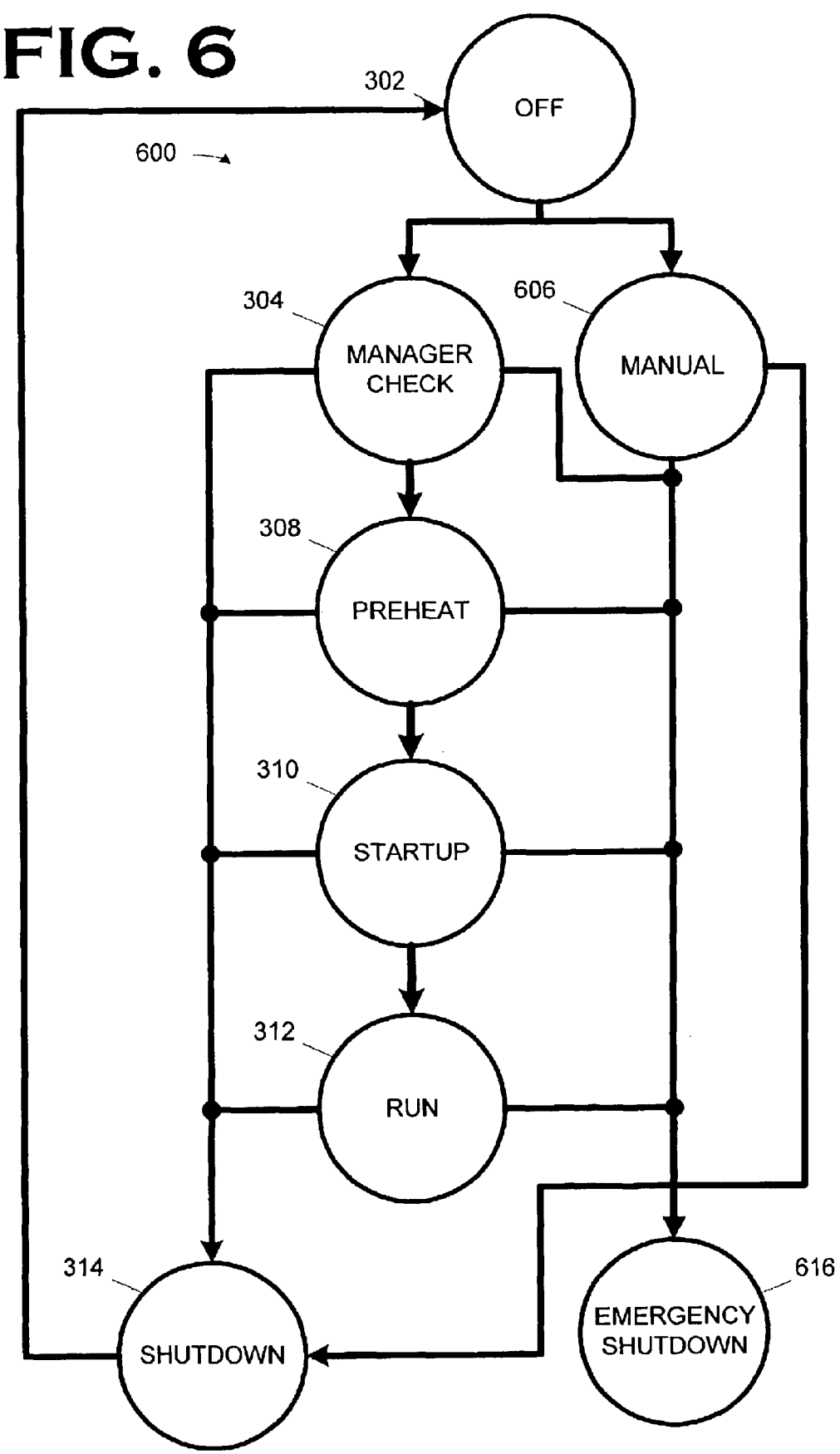
FIG. 6 is a state machine for the operational cycle of the one particular embodiment illustrated in FIG. 4–FIG. 5.

The illustrated embodiment implements the operational cycle 600 in FIG. 6, which represents the operational states and the transition among them of the subsystem managers 504–514. Note that the operational cycle 600 includes operational states in addition to those in the operational cycle 300 in FIG. 3. Each of the subsystem managers 504–514 transitions through eight different states in this particular embodiment, although not all eight to in every operational cycle:

an "off" state 302;

a "manager check" state 304, in which the subsystem managers 504–514 check the operational readiness of their respective physical subsystem 402–412;

a "manual" state 606, in which an operator can direct operation of the overall system;

a "preheat" state 308, in which the heating elements and fluids of the fuel processor 102 are preheated, or pre-cooled, to their designated levels for normal operation;

a "startup" state 310, in which the fuel processor 102 begins operation under start-up conditions;

a "run" state 312, in which the fuel processor 102 operates under steady-state conditions;

a "shutdown" state 314, in which the physical subsystems 402–412 of the overall system shutdown their operation to a planned end of an operational cycle; and an "emergency shutdown" state 616, in which the physical subsystems 402–412 are shut down in response to the occurrence and detection of an emergency condition in one or more of the physical subsystems.

Although each of the subsystem managers 504–514 transitions through the same eight states, the tasks assigned to each of the subsystem managers 504–514 will be unique in light of the requirements of their respective physical subsystem 402–412. For example, the tasks performed by the fuel subsystem manager 504 in the run state 312 will differ from the tasks of the ATR subsystem manager 512 in the run state, given the differences in the operation and function of the fuel subsystem 406 and the ATR 402, both shown in FIG. 4.

Referring now to FIG. 6, the off state 602 can be reached from initialization of the automated control system 106 (e.g., supplying power to the automated control system 106), or from the shutdown state 314, or the emergency shutdown state 616. The ATR 402 of the fuel processor 102 remains in the off state 602 until it receives a user input or an instruction to advance out of the off state 602. The flow of the architecture dictates that certain conditional statements must be met prior to transition from one operational state to the next. In this instance, the conditional between the off state 602 and the manager check state 604 would be initiated via a hardwired switch (not shown) external to the reactor (also not shown), or from a software initialized start.

Coming out of the off state 602, the subsystem managers 504–514 may transition their respective physical subsystems 402–412 into either the manager check state 604 or the manual state 606. From the manual state 606, the subsystem managers 504–514 transition their respective physical subsystems 402–412 only to either the shutdown state 614 or the emergency shutdown state 616. From the manager check state 604, the system managers 504–514 may transition their respective physical subsystems 402–412 through the preheat state 608, startup state 610, and run state 612. The subsystem managers 504–514 can transition their respective physical subsystems 402–412 into either of the shutdown state 614 and the emergency shutdown state 616 from any of the other operational states.

Referring now to FIG. 5 and FIG. 6, an operator chooses whether to enter the manual state 606 on powering up or initializing the system, i.e., exiting the off state 302. If the operator does not choose the manual state 606, the master control manager 502 assumes control. In the manual state 606, the operator can choose a percentage of operational capacity and the system ramps up to the set points of the specified level, but still applies control logic. That is, the subsystem managers 504–514 still cooperate with one another through the master control manager 500 as described above.

Assuming now that the operator does not assume manual control, the master control manager 502 sends a signal to each of the subsystem managers 504–514 to transition their respective physical subsystems 402–412 to the manager check state 304. Each of the subsystem managers 504–514 then transitions their respective physical subsystems 402–412 to the manager check state 304. The subsystem managers 504–514 then perform their respective tasks associated with the manager check state 304. The exit conditionals for the manager check state 304 include, but are not limited to: ensuring adequate process gas delivery pressure, that the air blower (not shown) is capable of cycling on and registering flow, and the heaters (also not shown) are capable of generating some incremental increase in heat. In the manager check state 304, the subsystem managers 504–514 initiate requests to the appropriate subsystems mangers 504–514 through the master control manager 502 to balance the fuel processor 102's operations for meeting specific conditions. The conditional between the manager check state 304 and the preheat state 308 are the verification that each conditional placed inside the manager check state 304 is met.

If the manager check conditionals are not met, the operational cycle 600, shown in FIG. 6, flows to the shut down state 314 and then back to the off state 302. On the other hand, when the individual subsystem managers 504–514, shown in FIG. 5, have completed their tasks associated with the manager check state 304, they individually signal that fact to the master control manager 502. The master control manager 502 waits until all the subsystem managers 504–514 have signaled they are through, and then signals the subsystem managers 504–514 to transition their respective physical subsystems 402–412 to the preheat state 308.

Still referring to FIG. 6, The preheat state 308 begins firing off the oxidizer 404, shown in FIG. 4, and using heat generated in this lean burn reaction to preheat gases that will be fed into the ATR. The preheat state 308 initiates a light off sequence in the oxidizer 404 and once the reaction is stabilized, the conditionals to proceed to the startup state 310 are satisfied. If the light-off conditionals are not met, the operational cycle 600 flows to the shut down state 314 and then back to the off state 302. Otherwise, when the individual subsystem managers 504–514, shown in FIG. 5, have completed their tasks associated with the preheat state 308, including oxidizer 404 light-off, they signal that fact to the master control manager 502. The master control manager 502 waits until all the subsystem managers 504–514 have signaled they are through, and then signals the subsystem managers 504–514 to transition their respective physical subsystems 402–412 to the startup state 310.

The fourth state in the sequence of operation, shown in FIG. 6, is the startup state 310. The startup state 310 can be described as a state that begins by flowing fuel 403 (e.g., natural gas) through the preheat section (not shown) of the oxidizer 404, shown in FIG. 4, from the fuel subsystem 406. This fuel 403 is then used to transfer heat through the ATR 402 and is returned back to the oxidizer 404 for maintaining its temperature and internal reaction. The oxidizer 404 transitions from direct fuel 403 (e.g., natural gas) feed to the preheated, return off-gas from the ATR 402 to fuel its reaction. Once the reformer section (not shown) of the ATR 402 reaches a light off temperature, air 409 from the air subsystem 410 is also fed through the preheat section of the oxidizer 404 and then into the ATR 402.

The air 409 and fuel 403 mix and are delivered to the reformer's surface where they "light off" the reformer. The heat generated due to the reaction in this section of the ATR 402 is carried through the reactor, thereby "warming up" the remaining reactor beds (also not shown). Once the reactor beds reach a desired temperature, water 407 from the water subsystem 408 is mixed with the reactant air 409 and the fuel 403 and is delivered to the reformer of the ATR 402. This process results in varying degrees of hydrogen-based reformate 405 to be generated inside the ATR 402, and is delivered back to the oxidizer 404 for continuing the preheat function.

If the startup conditionals are not met or active diagnostics are triggered, the operational cycle 600, shown in FIG. 6, flows to the shut down state 314 and then back to the off state 302. However, once the reformate reaches a stable composition that is considered to be of fuel cell quality, the conditionals to proceed to the run state 312 are satisfied. The individual subsystem managers 504–514, shown in FIG. 5, have completed their tasks associated with the startup state 310, they signal that fact to the master control manager 502. The master control manager 502 waits until all the subsystem managers 54–514 have signaled they are through, and then signals the subsystem managers 504–514 to transition to the run state 312.

Still referring to FIG. 6, the run state 312 is the fifth state in the sequence of operation. The run state can be described as a state that begins by diverting the reformate stream gradually from the oxidizer 404, shown in FIG. 4, to the recommended reformate feed source. Any off gas, resulting from excess stoich or flow to the feed location is again returned to the oxidizer 404 to sustain the preheat function. Supplemental fuel could be required to the oxidizer 404 during this transition phase of the reformate to the feed source. During this state the reactor is considered to be operating or "running."

The general course of state transition therefore repeats as the subsystem managers 504–514, shown in FIG. 5, transitions the respective physical subsystems 402–412 through the operational states shown in FIG. 6, i.e., transition, perform state- and subsystem-specific tasks, signal completion, await signal from the master control manager 502 to transition. Note that the subsystem managers 504–514 transition their respective physical subsystems 402–412 to the next state only when signaled to do so by the master control manager 502. Note also that the master control manager 502 only signals the subsystem managers 504–514 to transition when all of the subsystem managers 504–514 are ready to do so. Thus, the subsystem managers 504–514 transition through their states in a synchronized fashion under the direction of the master control manager 502.

The operation of the fuel processor 102 under the control of the control system 500 will now be described in more detail. The following discussion refers to various elements of the invention shown in:

FIG. 4, i.e., the subsystems 402–412 of the fuel processor 102;

FIG. 5, i.e., the software-implemented managers 502–514 in the hierarchical control system 500 for the automated control system 106; and FIG. 6, i.e., the operational states 302–314, 606, and 616, through which the subsystems 406–412 transition.

In addition, the discussion will reference FIG. 7, FIG. 8A–FIG. 8E, FIG. 9A–FIG. 9E, FIG. 10A–FIG. 10E, FIG. 11A–FIG. 11E, and FIG. 13A–FIG. 13E illustrating selected events that occur during the various operational states 302–314, 606, and 616 in the illustrated embodiment.

Figure 7:
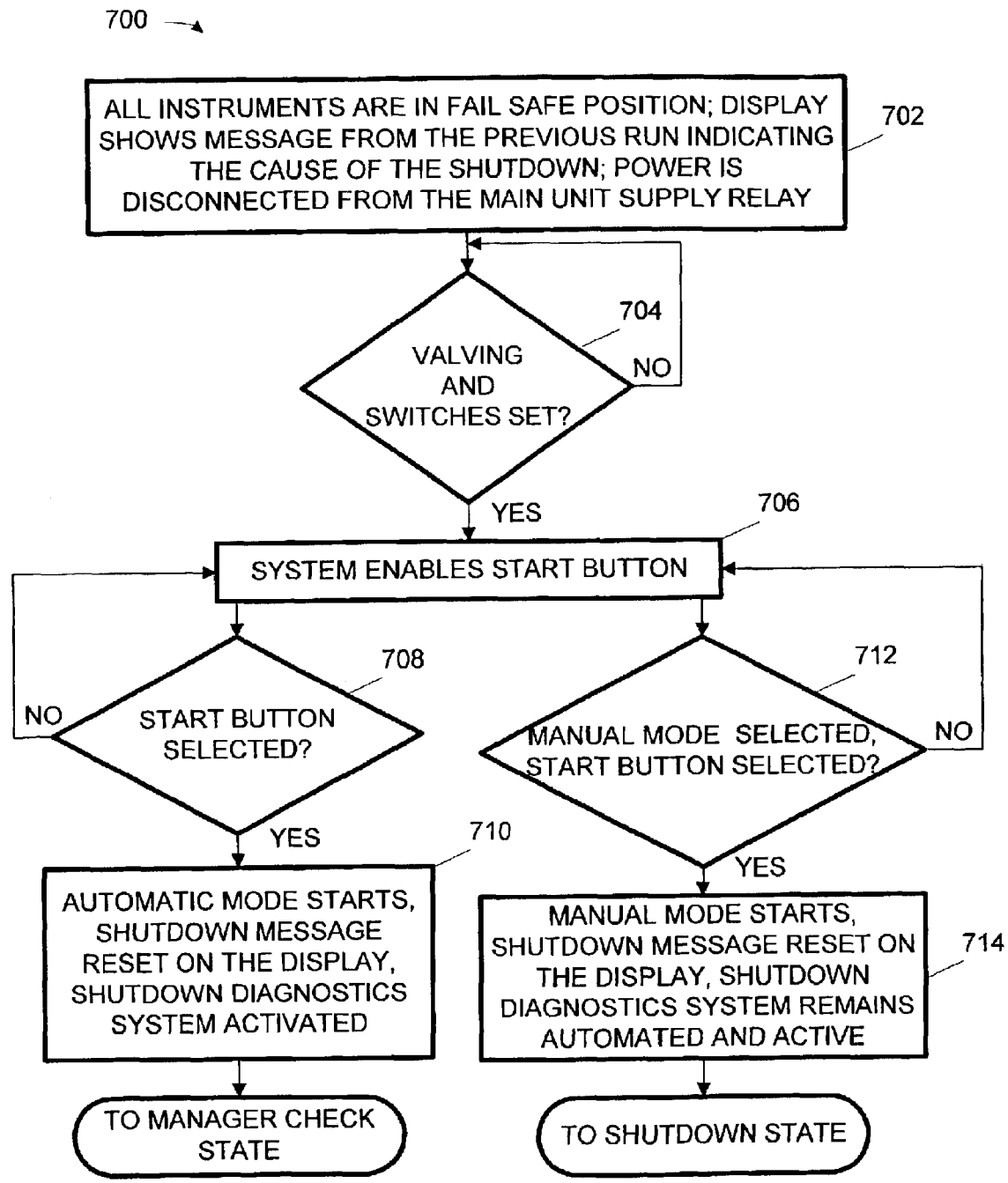
FIG. 7 illustrates selected events occurring in the "off" operational state of the embodiment illustrated in FIG. 4–FIG. 6.

Referring now to FIG. 7 (at 700), in the off state 302 (shown in FIG. 6), all the instruments (not individually shown) are in their fail safe position (at 702). The display 240, shown in FIG. 2A, FIG. 2B, shows a message from the previous run indicating the cause of the shutdown (at 702) for that run. Power is also disconnected (at 702) from the main unit power supply relay (not shown). If the valving and switches (not individually shown) of the fuel processor 102 are properly set (at 704), the automated control system 106 enables (at 706) the START button, which is not indicated but may be a part of the keypad 250, shown in FIG. 2A, FIG.

2B. The user interface 245 also includes a MANUAL button, not indicated but which may be a part of the keypad 250. If the start button is selected (at 708), then the fuel processor 102 (at 710) begins operation in the "automatic" mode, resets the message on the display 240, and activates the shutdown diagnostics capabilities of the automatic control system 106. If both the START button and the MANUAL button are selected (at 712), then the fuel processor 102 begins (at 714) operation in the manual mode, resets the message on the display 240, and activates the shutdown diagnostics capabilities of the automatic control system 106. Note that, even in the manual mode, the shutdown diagnostics capabilities remain automated (at 714).

Thus, on power up or reset, the fuel processor 102 and the control system 500 transition from first, the off state 302, shown in FIG. 6, to either the manager check state 304 or the manual state 606, depending on operator input. Again assuming the operator does not assume manual control, the master control manager 502 signals the subsystem managers 504–514 to transition their respective physical subsystems 402–412 to the manager check state 304, in which the subsystem managers 504–514 check the operational readiness of their respective physical subsystems 402–412. Each of the physical subsystems 402–412 performs different tasks in the manager check state 304. These tasks are illustrated in FIG. 8A–FIG. 8G.

Figures 8A, 8B:
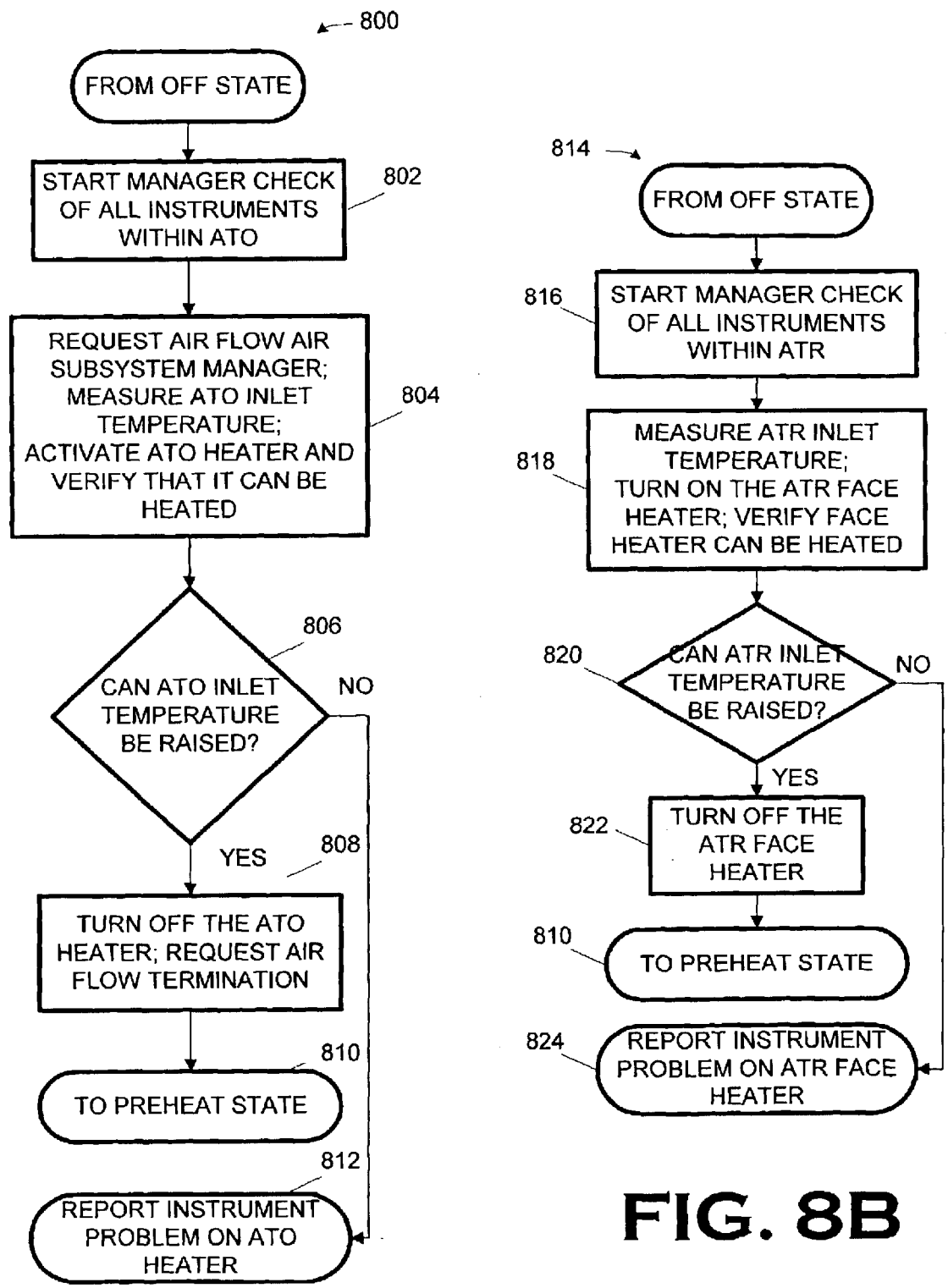
FIG. 8A–FIG. 8F illustrates selected events occurring in the "manager check" operational state of the embodiment illustrated in FIG. 4–FIG. 6.

FIG. 8A illustrates (at 800) selected events for the oxidizer 404 in the manager check state 304. As the fuel processor 102 transitions from the off state 302 to the manager check state 304, the ATO subsystem manager 510 begins (at 802) the manager check of all the instruments in the oxidizer 404. The ATO subsystem manager 510 then (at 804) requests air flow from the air subsystem manager 508 through the master control manager 502, measures the ATO inlet (not shown) temperature, tests the ATO heater (also not shown) to verify that it can heat the inlet temperature sufficiently. If the ATO heater can raise the inlet temperature (at 806), the ATO subsystem manager 510 then (at 808) turns off the ATO heater and requests air flow be terminated. The oxidizer 404 is then ready (at 810) is ready to transition to the preheat state 308. If the ATO heater cannot raise the inlet temperature sufficiently (at 806), then the ATO subsystem manager 510 (at 812) reports an instrument problem on the ATO heater to the master control manager 502.

Manager check state 304 activities for the ATR 402 are illustrated in FIG. 8B. As the fuel processor 102 transitions from the off state 302 to the manager check state 304 (at 814), the ATR subsystem manager 512 begins (at 816) the manager check of all the instruments in the ATR 402. The ATR subsystem manager 512 (at 818) measure the ATR inlet (not shown) temperature and verifies that the ATR face heater (not shown) can be heated. Note that shift heaters (not shown) are not checked since there is no natural gas flow and heating the shift catalyst without flowing gas would cause the damage. If the ATR inlet temperature can be raised (at 820), then the ATR subsystem manager 512 turns off the ART face heater and is ready (at 810) to transition to the preheat state 308. If the ATR inlet temperature cannot be raised (at 820), then the ATR subsystem manager 512 reports (at 824) an instrument problem on the ATR face heater to the master control manager 502.

Figure 8C:
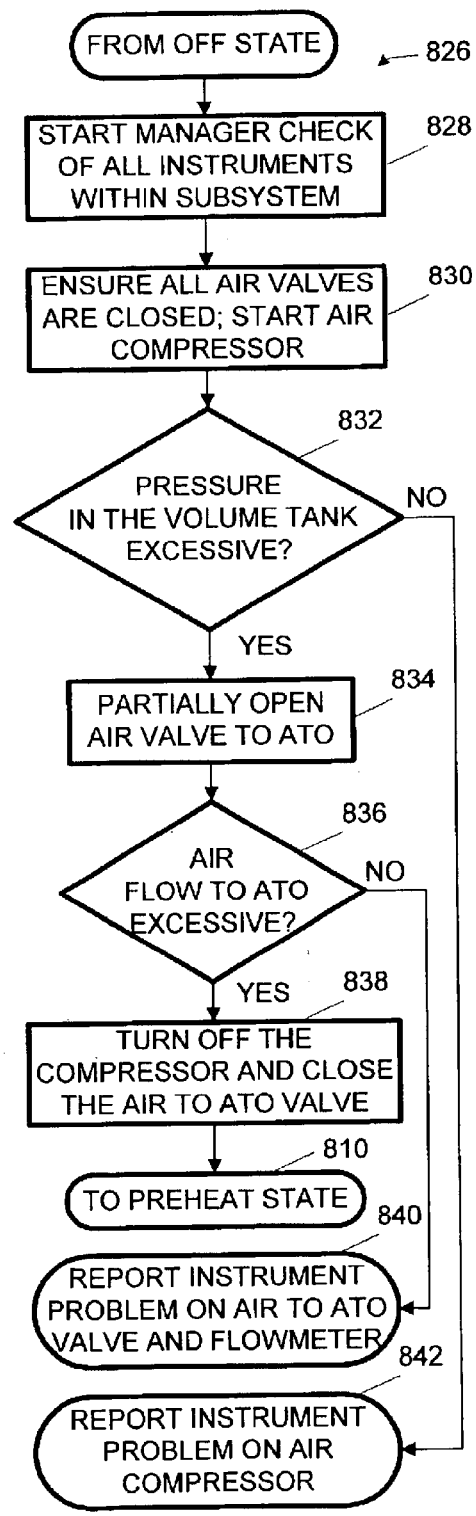

Referring now to FIG. 8C, as the fuel processor 102 transitions from the off state 302 to the manager check state 304 (at 826), the air subsystem manager 508 begins (at 828) the manager check of all the instruments in the air subsystem 410. The air subsystem manager 508 (at 830) ensures all air valves (not shown) are closed and starts the air compressor (not shown) at less than full capacity. If pressure in a volume tank (not shown) is excessive (at 832), then the air subsystem manager 508 partially opens (at 834) an air valve (not shown) to the oxidizer 404. If the air flow to the oxidizer 404 is excessive (at 836), then the air subsystem manager 508 (at 838) turns off the compressor and closes the air 409 to the ATO valve it earlier opened. The air subsystem 410 is then ready (at 810) to transition to the preheat state 308. If, however, the air flow to the oxidizer 404 is not excessive (at 836), then the air subsystem manager 508 reports (at 840) an instrument problem on air to the ATO valve and flowmeter to the master control manager 502. Similarly, if the pressure in the volume tank is not excessive (at 832), then the air subsystem manager 508 reports (at 842) an instrument problem on air to the air compressor to the master control manager 502.

Figure 8D:
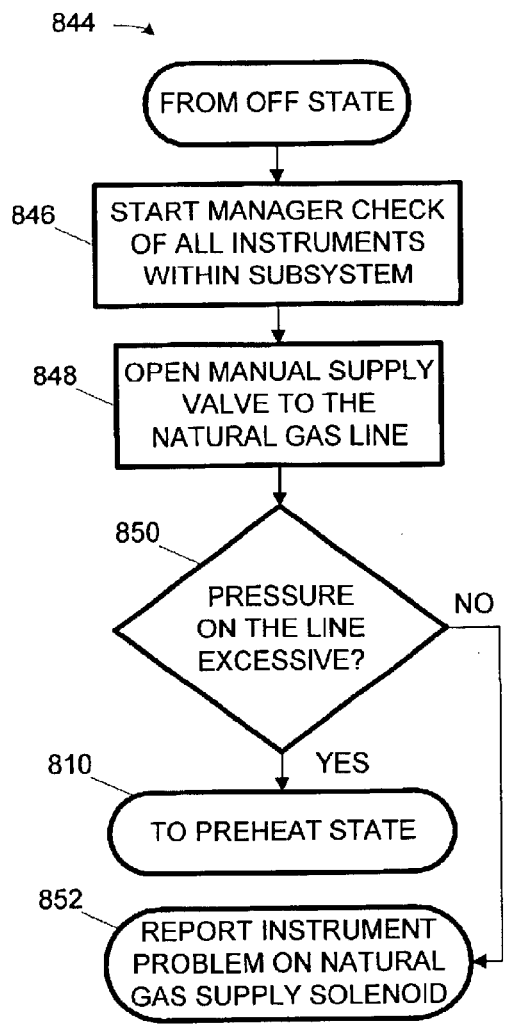

FIG. 8D illustrates (at 844) the manager check slate 304 activities for the fuel subsystem 406. As the fuel processor 102 transitions from the off state 302 to the manager check state 304 (at 844), the fuel subsystem manager 504 begins (at 846) the manager check of all the instruments in the fuel subsystem 406. The fuel subsystem manager 504 then (at 848) opens a manual supply valve (not shown) to the natural gas line (also not shown) from which the fuel 403 is received. If the pressure on the natural gas line is adequate (at 850), then the fuel subsystem 406 is then ready (at 810) to transition to the preheat state 308. If the pressure on the natural gas line is not adequate (at 850), then the fuel subsystem manager 504 reports (at 852) an instrument problem on the natural gas supply solenoid to the master control manager 502.

Figures 8E, 8F:
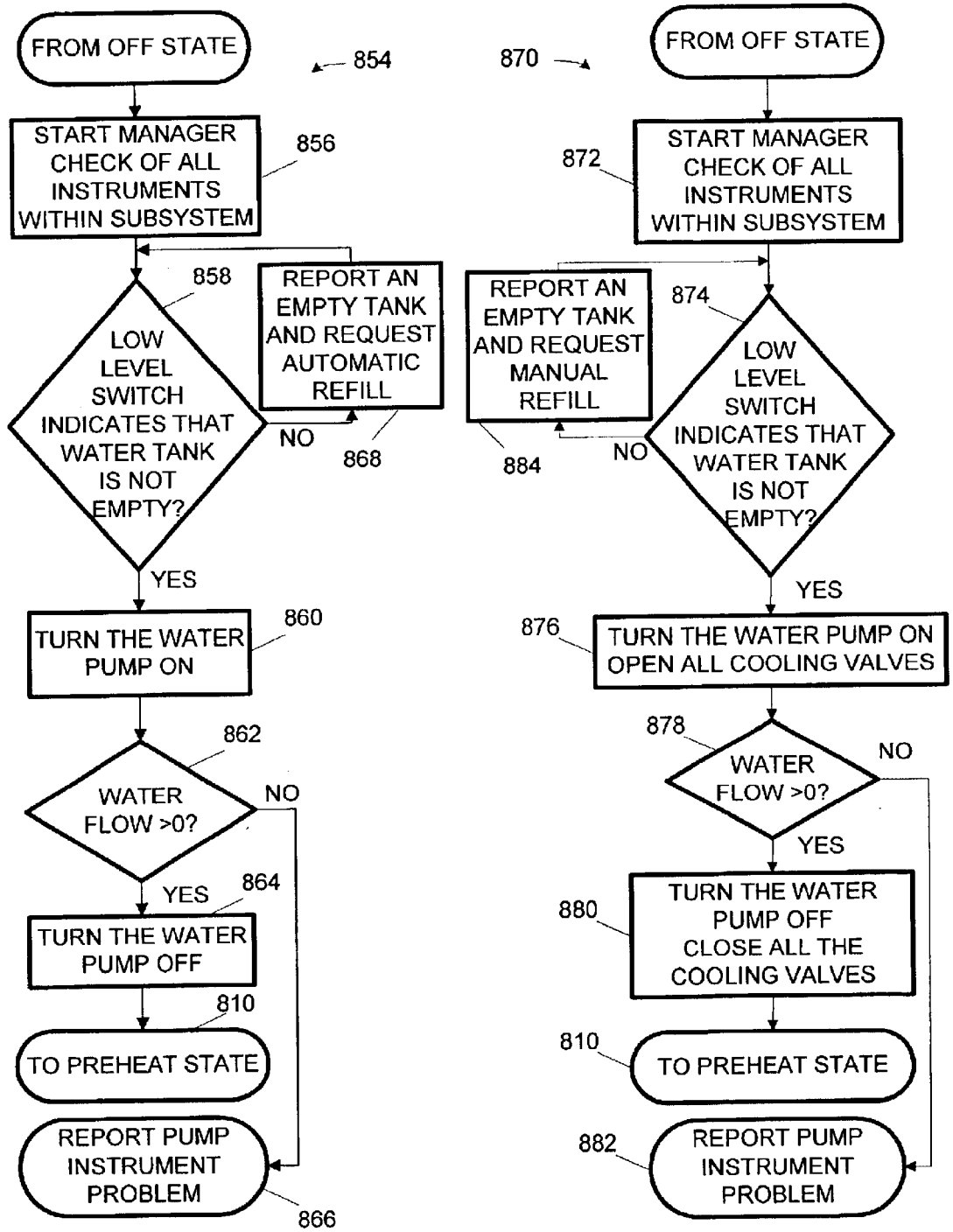

Manager check state 304 activities for the water subsystem 408 are illustrated in FIG. 8E. As the fuel processor 102 transitions from the off state 302 to the manager check state 304 (at 854), the water subsystem manager 506 begins (at 856) the manager check of all the instruments in the water subsystem 408. If a low level switch (not shown) in a tank (not shown) holding the water 407 indicates (at 858) that the tank is not empty, the water subsystem manager 506 turns on (at 860) the water pump (not shown). If water flows (at 862), the water subsystem manager 506 turns off the water pump (at 864) and the water subsystem 408 is ready to transition to the preheat state (at 810). If water 407 does not flow (at 862) when the water pump is turned on (at 860), the water subsystem manager 506 reports (at 866) a pump instrumentation problem to the master control manager 502. If the water tank is empty (at 858), then the water subsystem manager 506 reports (at 868) that the tank is empty to the master control manager 502 and requests an automatic refill.

Referring now to FIG. 8F, as the fuel processor 102 transitions from the off state 302 to the manager check state 304 (at 870), the thermal subsystem manager 514 begins (at 872) the manager check of all the instruments in the thermal subsystem 412. If a low level switch (not shown) in a tank (not shown) holding the water 407 indicates (at 874) that the tank is not empty, the thermal subsystem manager 514 turns on (at 876) the water pump (not shown) and opens (at 876) the cooling valves (also not shown). If water flows (at 878), the thermal subsystem manager 514 turns off the water pump (at 864), closes the cooling valves (at 864), and the thermal subsystem manager 514 is ready to transition to the preheat state (at 810). If water 407 does not flow (at 878) when the water pump is turned on (at 876), the thermal subsystem manager 514 reports (at 882) a pump instrumentation problem to the master control manager 502. If the water tank is empty (at 874), then the water subsystem manager 506 reports (at 884) that the tank is empty to the master control manager 502 and requests an automatic refill.

Once each of the subsystem managers 504–514 signals (at 810) the master control manager 502 that their respective physical subsystems 402–412 has passed the manager check, the master controller 502 signals the subsystem managers 504–514 to transition their respective physical subsystems 402–412 to the preheat state 308. In the preheat state 308, the heating elements and fluids of the respective physical subsystems are preheated, or precooled, to their designated levels for normal operation. However, if a subsystem manager 504–514 reports an error (at 812, in FIG. 8A; at 824, in FIG. 8B; at 840, 842, in FIG. 8C; at 852, in FIG. 8D; at 866, FIG. 8E; at 882, in FIG. 8F) to the master control manager 502 in the manager check state 304, the master control manager 502 signals the subsystem managers 504–514 to transition their respective physical subsystems 402–412 to the shutdown state 314 and the off state 302, as was discussed above, providing the appropriate diagnostic notification of the issue.

Selected activities of the preheat state 308 are shown in FIG. 9A–FIG. 9E for the oxidizer 404, the ATR 402, the air subsystem 410, the water subsystem 408, and the thermal subsystem 412, respectively. As mentioned earlier, the principal function of the preheat state 308 is to preheat gases that will be fed into the ATR 402 from the oxidizer 404. As will be appreciated by those skilled in the art having the benefit of this disclosure, the fuel processor 102 cannot simply step into production. For instance, the oxidizer 404 cannot begin to preheat feedstocks until it has fuel 403, water 407, and air 409 to preheat. Similarly, the ATR 402 cannot begin to reform the preheated feedstocks (no number on the arrow for this combined feed in FIG. 4) until it has received sufficient feed stocks from the oxidizer 404. The air subsystem 410, the fuel subsystem 406, the water subsystem 408, and the thermal subsystem 412 provide air 409 (at 910, in FIG. 9C), fuel 403 (at 928, in FIG. 9B), water 407 (at 912, in FIG. 9D), and thermal control (at 914, in FIG. 9E) to the oxidizer 404 and ATR 402 in furtherance of this goal.

Figure 9A:
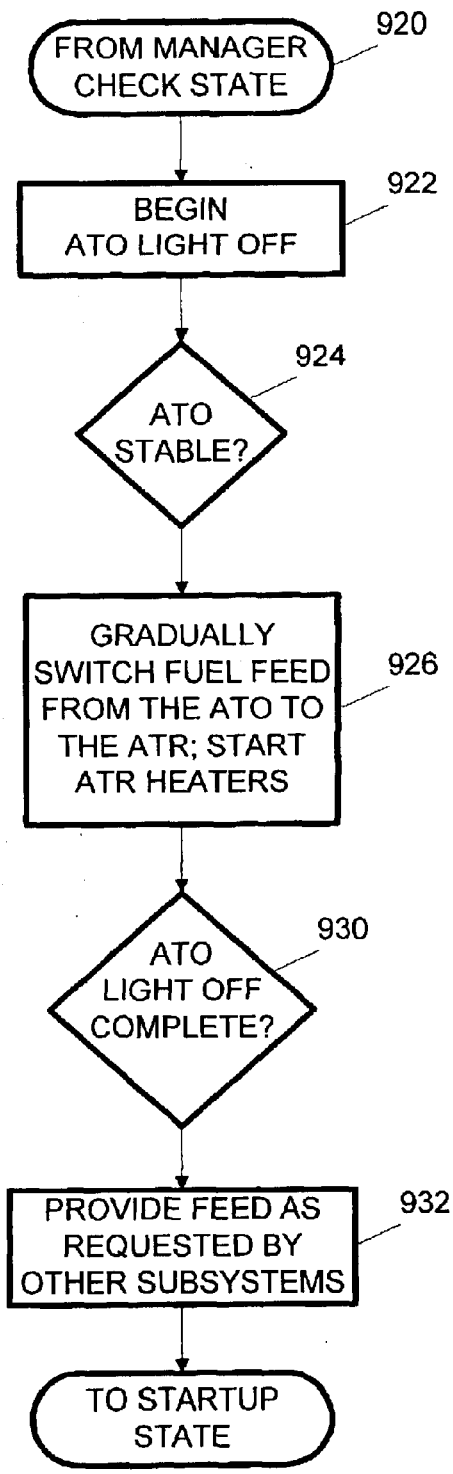
FIG. 9A–FIG. 9E illustrate selected activities of the "preheat" state of the embodiment illustrated in FIG. 4–FIG. 6.
Figure 9B:
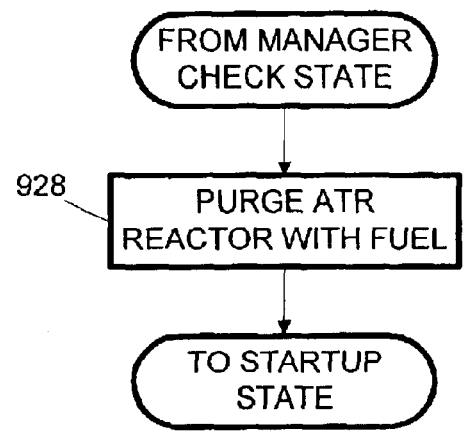
Figure 9C:
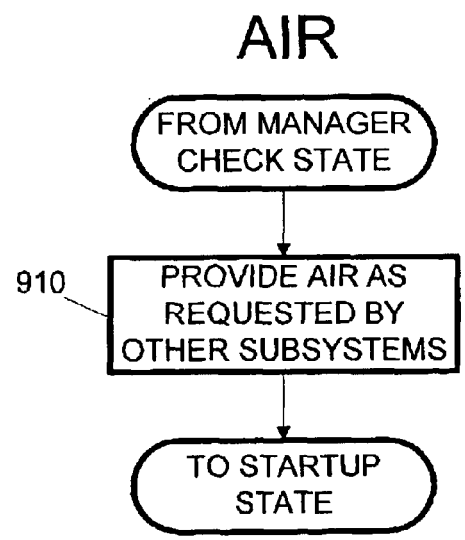
Figure 9D:
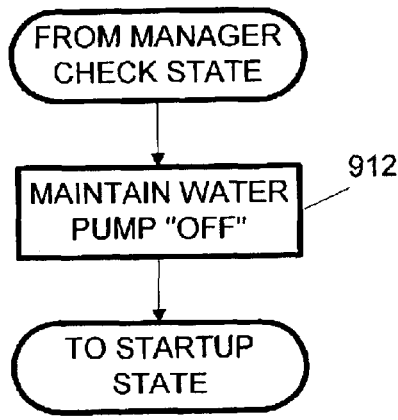
Figure 9E:
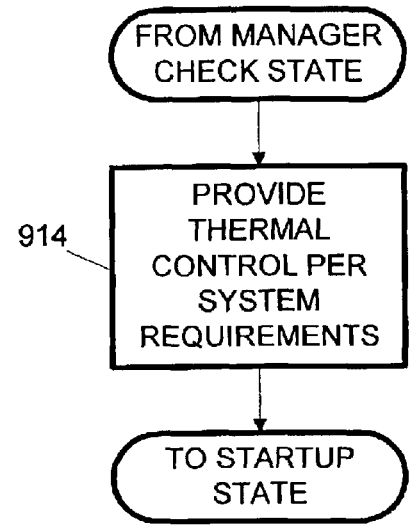
Figure 10A:
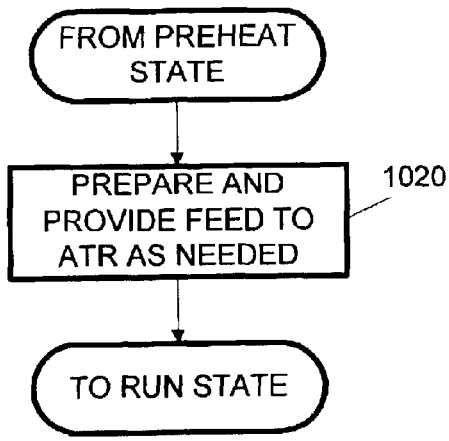
FIG. 10A–FIG. 10E illustrate selected activities of the "startup" state of the embodiment illustrated in FIG. 4–FIG. 6.
Figure 10B:
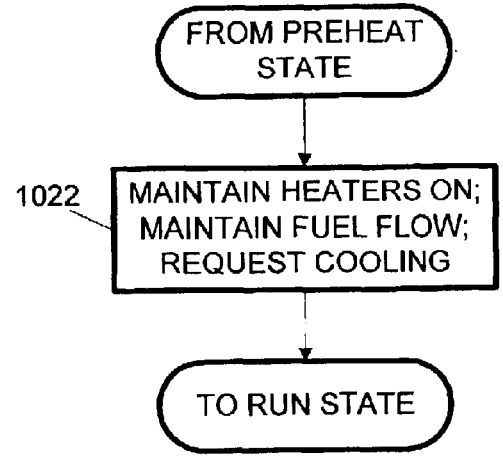
Figure 10C:
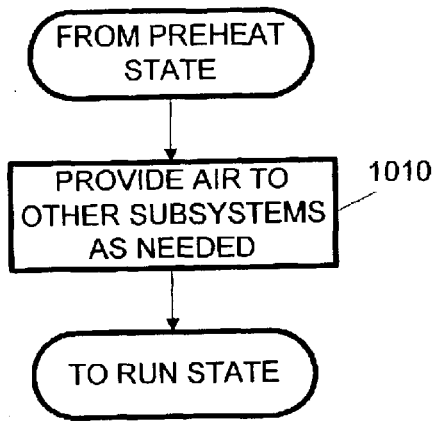
Figure 10D:
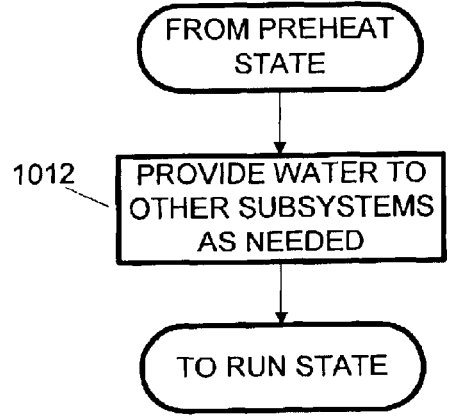
Figure 10E:
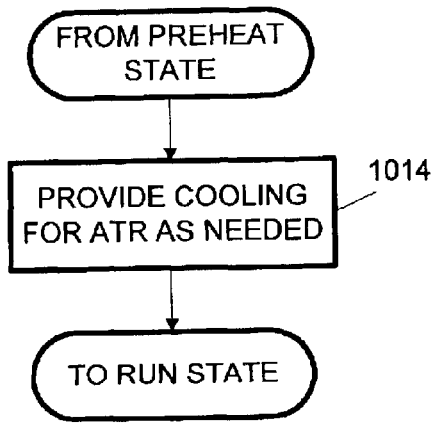
Figure 11A:
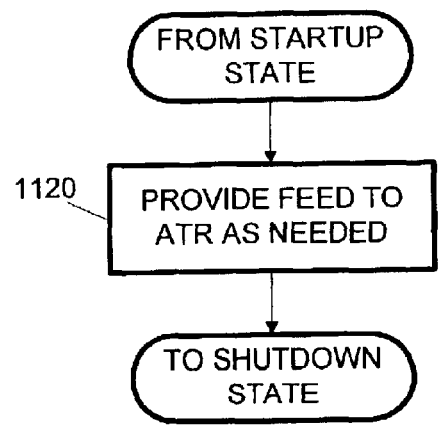
FIG. 11A–FIG. 11E illustrate selected activities of the "run" state of the embodiment illustrated in FIG. 4–FIG. 6.
Figure 11B:
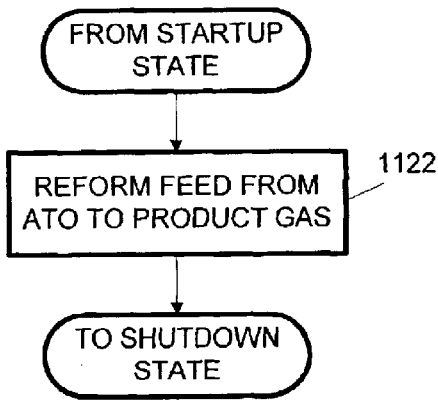
Figure 11C:
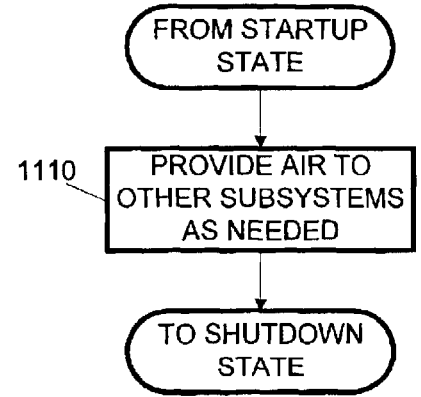
Figure 11D:
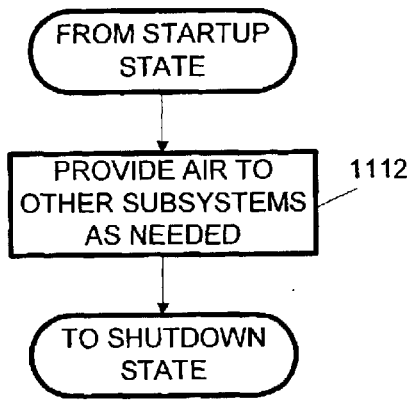
Figure 11E:
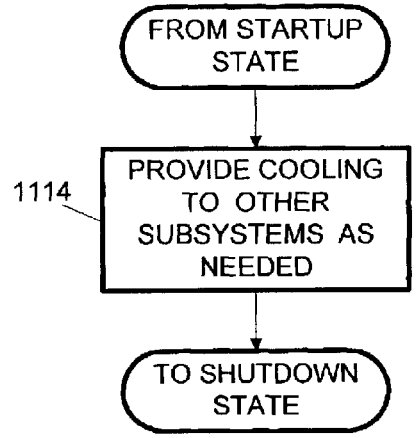

Upon transitioning into the preheat state 308 (at 920, in FIG. 9A), the oxidizer 404 begins to light off (at 922, in FIG. 9A). "Light off" essentially is the condition under which the oxidizer 404 has an ongoing catalyst reaction with the fuel 403 and air 409 under given temperature. This typically involves heating a catalyst (not shown) and flowing air 409 thru the oxidizer 404 reactor (also not shown). Once the catalyst begins and the oxidizer 404 reactor stabilizes (at 924, in FIG. 9A), the fuel 403 is gradually switched (at 926, in FIG. 9A) to the ATR 402. The ATR 402 uses the fuel 403 to purge (at 928, in FIG. 9B) its reactor. When the oxidizer 404 light off is complete (at 930, in FIG. 9A), the oxidizer 404 provides process feed stream 411 (i.e., a water 407, air 409, and fuel mixture) to other subsystems 402, 406–412 as they request it. If the oxidizer 404 light off process begins and does not complete, or completes too slowly, a shutdown is initiated.

Once all the subsystem managers 504–514 signal that their respective physical subsystem 402–412 has completed its preheat tasks, the master control manager 502 signals them to transition to the startup state 310, in which the fuel processor 102 begins operation under start-up conditions. The startup state 310 activities are shown in FIG. 10A–FIG. 10E. The air subsystem 410, the water subsystem 408, and the thermal subsystem 412 continue to provide air 409 (at 1010, in FIG. 10C), water 407 (at 1012, in FIG. 10D), and thermal control (at 1014, in FIG. 10E) to the oxidizer 404 and ATR 402. The oxidizer 404 begins preparing and providing process feed stream 411 (at 1020, in FIG. 10A) as the ATR 402 maintains its heaters, cooling, and fuel flow (at 1022, in FIG. 10B) until both reach steady state operational conditions.

More particularly, the startup state 310 begins by flowing natural gas or other fuel 403 through the preheat section (not shown) of the oxidizer 404. This gas is then used to transfer heat through the reformer of the ATR 402 and is returned back to the oxidizer 404 to maintain its temperature and internal reaction. The oxidizer 404 is transition from direct natural gas feed to the preheated, return off gas from the ATR 404. Once the reactor section of the ATR 404 reaches a light off temperature, air 409 is also fed through the preheat and then into the reactor. Air and fuel mix and are delivered to the ATR surface where they "light off" the reformer of the ATR 404. The heat generated in this section of the ATR 404 is carried through the rest of the ATR 404, "warming up" the remaining reactor beds (not shown). Once the reactor beds reach a specified temperature, water 407 is mixed with the reactants air 409 and fuel 403 and is delivered to the ATR. This process results in varying degrees of Hydrogen based reformate to be generated inside the Reactor, and is delivered back to the oxidizer 404 for continuing the preheat function. Once the reformate, i.e., the reformate 405, reaches a stable composition that is considered to be of fuel cell quality, the conditionals to proceed to the run state 312 are satisfied.

Once all the subsystem managers 504–514 signal that their respective physical subsystems have reached steady-state operational conditions, the master control manager 502 signals them to transition to the run state 312. The run state 312 activities are shown in FIG. 11A–FIG. 11E. In the run state 312, the fuel processor 102 operates under steady-state conditions. The overall function of the fuel processor 102 is to reform the fuel 403, shown in FIG. 4, for use by the fuel cell 104. Thus, the operation of the fuel processor 102 centers around the operation of the ATR 402 and the delivery of fuel 403, air 409, and water 407 (all shown in FIG. 4) to the ATR 402 from the fuel subsystem 406, water subsystem 408, and air subsystem 410. The air subsystem 410, the water subsystem 408, and the thermal subsystem 412 continue to provide air 409 (at 1110, in FIG. 11C), water 407 (at 1112, in FIG. 11D), and thermal control (at 1114, in FIG. 11E) to the oxidizer 404 and ATR 402. The oxidizer 404 provides at 1120, in FIG. 11A) process feed stream 411 to the ATR 402 on request as the ATR 402 reforms (at 1122, FIG. 11B) the process feed stream 411 to the reformate 405.

Figure 12:
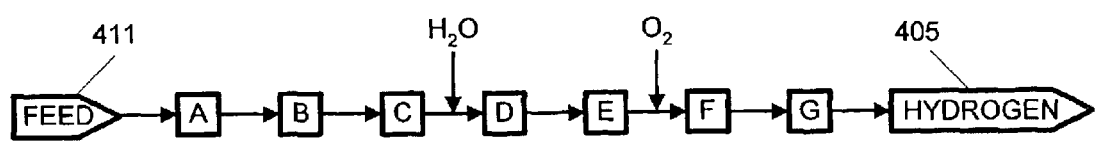
FIG. 12 graphically illustrates the reforming process of the autothermal reformer of the fuel processor first shown in FIG. 4 during the run state in the illustrated embodiment.
Figure 13A:
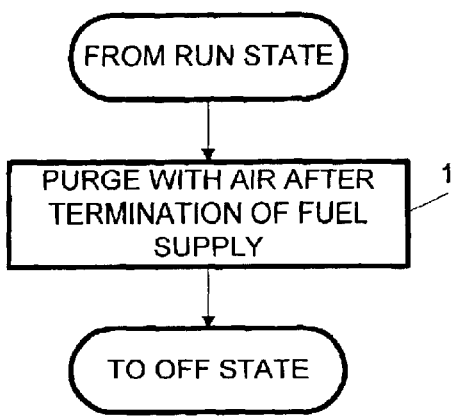
FIG. 13A–FIG. 13E illustrate selected activities of the "shutdown" state of the embodiment illustrated in FIG. 4–FIG. 6.
Figure 13B:
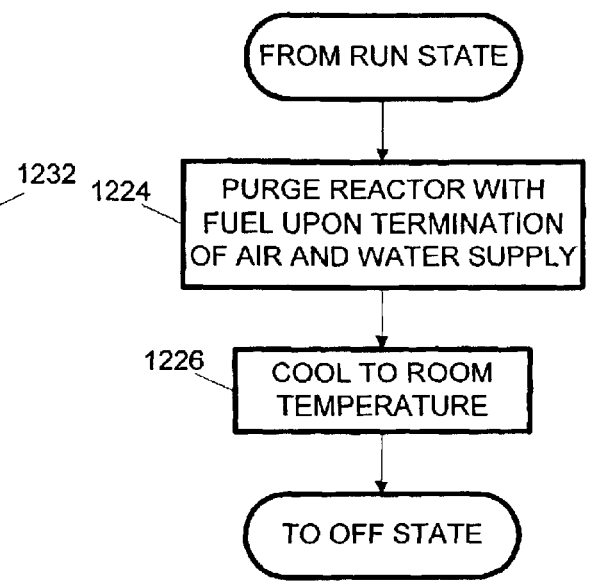
Figure 13C:
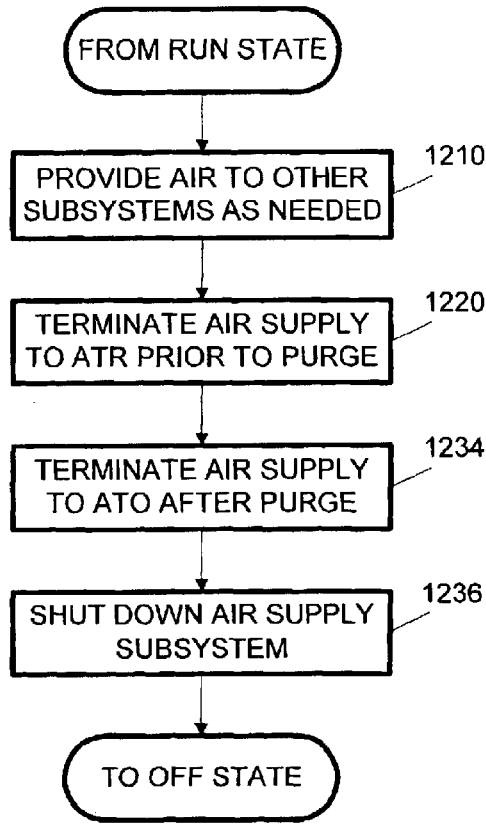
Figure 13D:
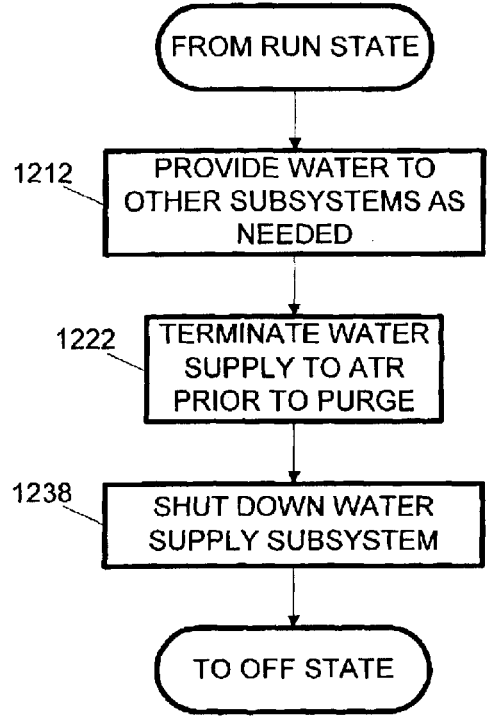
Figure 13E:
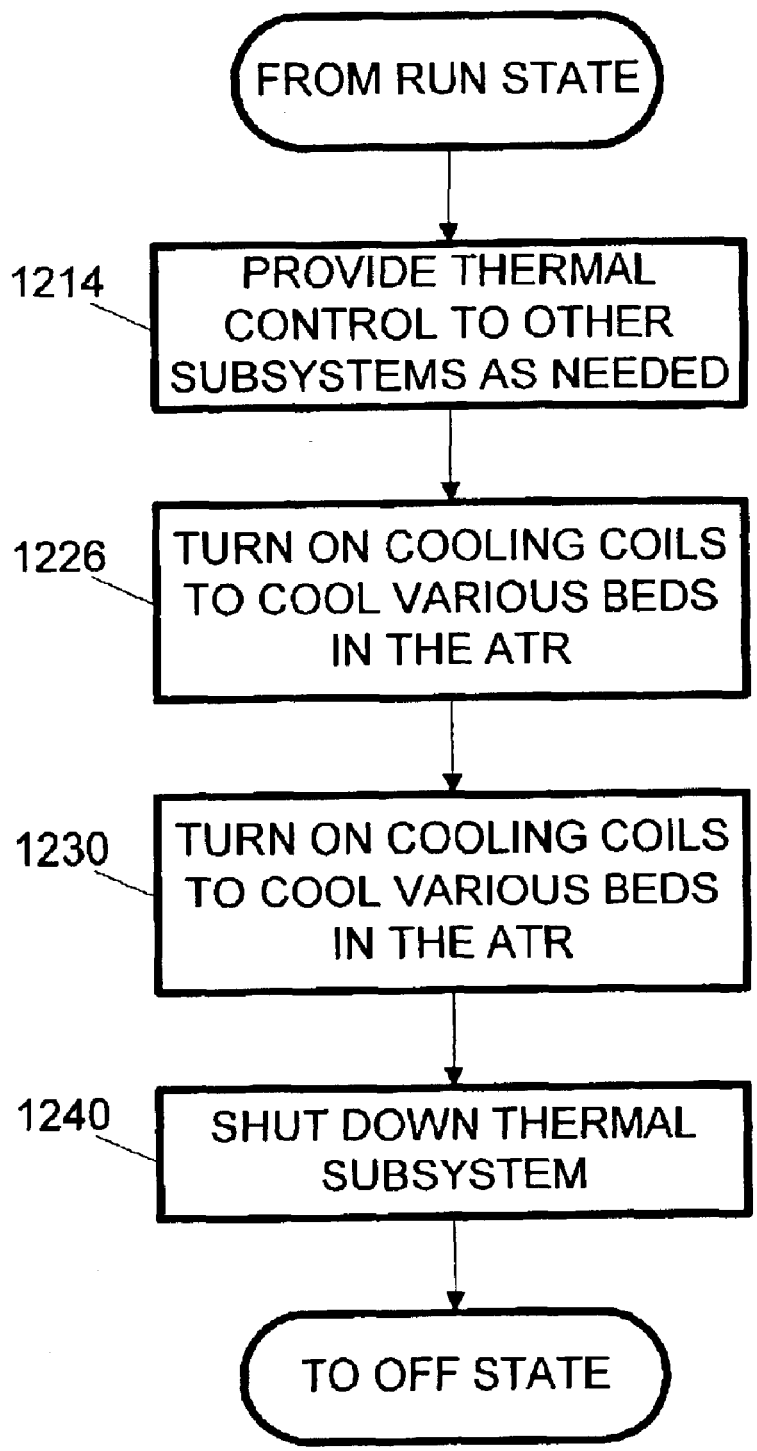

In operation, the processor reactor (not shown) of the ATR 404 reforms the process feed stream 411 into the hydrogen, or hydrogen-enriched, gas stream and effluent byproducts, such as water. The process feed stream 411 in the illustrated embodiment conveys a fuel, air, and water mixture from the oxidizer 404, shown in FIG. 4. FIG. 12 depicts a general process flow diagram illustrating the process steps included in the illustrative embodiments of the present invention. The following description associated with FIG. 12 is adapted from U.S. patent application Ser. No. 10/006,963, entitled "Compact Fuel Processor for Producing a Hydrogen Rich Gas," filed Dec. 5, 2001, in the name of the inventors Curtis L. Krause, et al., and published Jul. 18, 2002, (Publication No. US2002/0094310 A1).

The fuel processor 102 process feed stream 411 includes a hydrocarbon fuel, oxygen, and water mixture, as was described above. The oxygen can be in the form of air, enriched air, or substantially pure oxygen. The water can be introduced as a liquid or vapor. The composition percentages of the feed components are determined by the desired operating conditions, as discussed below. The fuel processor effluent stream from of the present invention includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream).

Process step A is an autothermal reforming process in which, in one particular embodiment, two reactions, a partial oxidation (formula I, below) and an optional steam reforming (formula II, below), are performed to convert the feed stream 411 into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3H_2 + CO \qquad (II)$$

The process feed stream 411 is received by the processor reactor from the oxidizer 404, shown in FIG. 4. A higher concentration of oxygen in the process feed stream 411 favors partial oxidation whereas a higher concentration of water vapor favors steam reforming. The ratios of oxygen to hydrocarbon and water to hydrocarbon are therefore characterizing parameters that affect the operating temperature and hydrogen yield.

The operating temperature of the autothermal reforming step A can range from about 550° C. to about 900° C., depending on the feed conditions and the catalyst. The ratios, temperatures, and feed conditions are all examples of parameters controlled by the control system of the present invention. The illustrated embodiment uses a catalyst bed of a partial oxidation catalyst in the reformer with or without a steam reforming catalyst.

Process step B is a cooling step for cooling the synthesis gas stream from process step A to a temperature of from about 200° C. to about 600° C., preferably from about 375° C. to about 425° C., to prepare the temperature of the synthesis gas effluent for the process step C (discussed below). This cooling may be achieved with heat sinks, heat pipes or heat exchangers depending upon the design specifications and the need to recover/recycle the heat content of the gas stream using any suitable type of coolant. For instance, the coolant for process step B may be the coolant 413 of the thermal subsystem 412.

Process step C is a purifying step and employs zinc oxide (ZnO) as a hydrogen sulfide absorbent. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet, etc.). Desulfurization is accomplished by converting the hydrogen sulfide to water in accordance with the following reaction formula III:

$$H_2S + ZnO \rightarrow H_2O + ZnS \qquad (III)$$

The reaction is preferably carried out at a temperature of from about 300° C. to about 500° C., and more preferably from about 375° C. to about 425° C.

Still referring to FIG. 12, the effluent stream may then be sent to a mixing step D in which water 407 received from the water subsystem 408, both shown in FIG. 4, is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G (discussed below). This temperature is also controlled by the control system of the present invention.

Process step E is a water gas shift reaction that converts carbon monoxide to carbon dioxide in accordance with formula IV:

$$H_2O + CO \rightarrow H_2 + CO_2 \qquad (IV)$$

The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step. This temperature and concentration are more parameters controlled by the control system of the present invention.

Returning again to FIG. 12, process step F is a cooling step. Process step F reduces the temperature of the gas stream to produce an effluent having a temperature preferably in the range of from about 90° C. to about 150° C. Oxygen from an air subsystem (not shown) is also added to the process in step F. The oxygen is consumed by the reactions of process step G described below.

Process step G is an oxidation step wherein almost all of the remaining carbon monoxide in the effluent stream is converted to carbon dioxide. The processing is carried out in the presence of a catalyst for the oxidation of carbon monoxide. Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \qquad (V)$$

$$H_2 + \tfrac{1}{2}O_2 \rightarrow H_2O \qquad (VI)$$

The preferential oxidation of carbon monoxide is favored by low temperatures. Since both reactions produce heat it may be advantageous to optionally include a cooling element such as a cooling coil, disposed within the process. The operating temperature of process is preferably kept in the range of from about 90° C. to about 150° C. Process step G reduces the carbon monoxide level to preferably less than 50 ppm, which is a suitable level for use in fuel cells.

The reformate 405 exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

Eventually, the operational cycle ends. If the end is planned, then the master control manager 502 signals the subsystem managers 504–514, all shown in FIG. 5, to transition their respective physical subsystems 402–412, shown in FIG. 4, to the shutdown state 314 at an appropriate time. As mentioned above, the subsystem managers 504–514 monitor, through their diagnostic module 610, shown in FIG. 6, their respective physical subsystems for the occurrence of error conditions. Some error conditions warrant shutting down operation of the fuel processor 102. If such a "shutdown" error condition is detected, the subsystem manager 504–514 detecting it reports it through the diagnostic module 610 and the diagnostic layer 520, shown in FIG. 5, to the master control manager 502. The master control module 502 then signals the subsystem managers 504–514 to transition to the emergency shutdown state 616.

However, in a standard shutdown in the shutdown state 310, the oxidizer 404 and ATR 402 reactors (not shown) are, in general terms, purged and cooled. On transition to the shutdown state 310, the air subsystem 410, the water subsystem 408, and the thermal subsystem 412 are providing air 409 (at 1310, in FIG. 13C), water 407 (at 1312, in FIG. 13D), and thermal control (at 1314, in FIG. 13E) to the oxidizer 404 and the ATR 402. In the illustrated embodiment, the ATR 402 is first purged and shutdown, followed by the oxidizer 404.

To shutdown and purge the ATR 402, the air subsystem 410 terminates the flow of air 409 (at 1320, in FIG. 13C), followed by the water subsystem 408 terminating (at 1322, in FIG. 13D) the flow of water 407, to the reactor of the ATR 402. The fuel subsystem 406 then continues (not shown) the flow of fuel 406 as the reactor of the ATR 402 purges (at 1324, in FIG. 13B) with the fuel 406. The thermal subsystem manager 514 then turns on (at 1326, in FIG. 13E) cooling coils (not shown) to cool various components of the ATR 402, including the reactor. The components are allowed to cool to room temperature (at 1328, in FIG. 13B), whereupon the thermal subsystem manager 514 then turns off (at 1330, in FIG. 13E) cooling coils.

To shutdown and purge the oxidizer 404, the fuel subsystem 406 terminates the flow of fuel 403 to the reactor of the oxidizer 404, whereupon the oxidizer 404 reactor is purged (at 1332, in FIG. 13A) with air 409 from the air subsystem 410. The oxidizer 404 reactor is purged until it reaches a predetermined temperature, as opposed to the ATR 402 reactor, which is purged by volume. This approach is taken in the oxidizer 404 reactor purging because differences in catalyst loading in different parts of the bed may be more active than the other. In the illustrated embodiment, the oxidizer 404 reactor is purged to room temperature. Once the oxidizer 404 reactor is purged, the air subsystem 410 terminates (at 1334, in FIG. 13C) the air supply to the oxidizer 404 and shuts down (at 1336, in FIG. 13C) the components (e.g., the compressor) of the air subsystem 410. The water subsystem 408 (at 1338, in FIG. 13C), fuel subsystem 406, and thermal subsystem 412 (at 1340, in FIG. 13C) also shut down the components of the water subsystem 408, fuel subsystem 406, and thermal subsystem 412.

Thus, the present invention separates the operational cycle 300 of the fuel processor 102, shown in FIG. 1, into a plurality of operational states, namely the off state 302, the manager check state 304, the preheat sate 308, the startup state 310, the run state 312, and the shutdown state 314, all shown in FIG. 3. Additional operational states, such as the manual state 606 and the emergency shutdown state 616, shown in FIG. 6, may also be employed. The operational cycle 300 is, in the illustrated embodiment, software controlled by the automated controller 106. The fuel processor 102 may be used to provide a reformate 108 to, for example, a fuel cell 104. In such an embodiment, the fuel processor 102 and the fuel cell 104 may be integrated into a power plant. However, the fuel processor 102 may be employed to any end in which a hydrogen-rich gas stream may be desired.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An operational cycle for a fuel processor capable of reforming a fuel, the operational cycle including:

an off state;

a manager check state entered into from the off state, and in which the operational readiness of the fuel processor is checked;

a preheat state entered into from the manager check state, and in which the fuel processor preheats gases, including the fuel, for mixing into a process feed stream;

a startup state entered into from the preheat state, and in which the fuel processor begins operating under start-up conditions;

a run state entered into from the startup state, and in which the fuel processor reforms the process feed stream into a reformate under steady-state conditions; and a shutdown state entered into any one of the manager check state, preheat state, startup state, and run state.

2. The operational cycle of claim 1, further comprising at least one of:

a manual state entered into from the off state, and into which an operator can direct operation of the overall system; and an emergency shutdown state entered into from any one of the manager check state, the startup state, and the run state.

3. The operational cycle of claim 1, wherein the off state comprises at least two of:

displaying a message indicating the cause of the shutdown of a previous operational cycle;

enabling the start of the operational cycle;

transitioning to the manager check state; and transitioning to the manual state.

4. The operational cycle of claim 1, wherein the off state comprises at least two of:

displaying a message indicating the cause of the shutdown of a previous operational cycle;

enabling the start of the operational cycle; and transitioning to the manager check state.

5. The operational cycle of claim 1, wherein the manager check state comprises:

checking the operational readiness of the constituent elements of the fuel processor;

transitioning to the preheat state.

6. The operational cycle of claim 1, wherein the manager check state comprises:

checking the operational readiness of the constituent elements of the fuel processor;

reporting an error detected during the check; and transitioning to the shutdown state if the error is detected.

7. The operational cycle of claim 1, wherein the preheat state includes:

providing air, water, and the fuel to an oxidizer;

lighting off the oxidizer; and purging a reactor of a reformer.

8. The operational cycle of claim 7, wherein the preheat state further includes transitioning to the startup state.

9. The operational cycle of claim 7, wherein the preheat state further includes:
   detecting an error in the providing the air, water, and fuel, or in lighting of the oxidizer, or in purging the reactor; and
   transitioning to the shutdown state.

10. The operational cycle of claim 1, wherein the startup state includes:
    ramping production of a process feed stream; and
    reforming the process feed stream as the production thereof builds.

11. The operational cycle of claim 1, wherein the startup state further includes transitioning the to run state.

12. The operational cycle of claim 10, wherein the startup state further includes:
    detecting an error in ramping production of the process feed stream or in reforming the process feed stream; and
    transitioning to the shutdown state.

13. The operational cycle of claim 1, wherein the run state includes:
    generating a process feed stream;
    reforming the process feed stream; and transitioning to the shutdown state.

14. The operational cycle of claim 13, wherein the run state further includes detecting an error in generating the process feed stream or in reforming the process feed stream before transitioning to the shutdown state.

15. The operational cycle of claim 1, wherein the shutdown state includes:
    purging an oxidizer and a reformer; and
    cooling the purged oxidizer and reformer.

16. A fuel processor, comprising:
    a supply of fuel, air and water;
    an oxidizer receiving the fuel air and water and generating a process feed stream;
    a reformer reforming the process feed stream into a hydrogen-rich gas; and
    an automated control system directing the generation of the supply of fuel, air and water, generating the process feed stream, and reforming the process feed through an operational cycle, the operational cycle including:
       an off state;
       a manager check state entered into from the off state, and in which the operational readiness of the fuel processor is checked;
       a preheat state entered into from the manager check state, and in which the fuel processor preheats gases, including the fuel, for mixing into a process feed stream;
       a startup state entered into from the preheat state, and in which the fuel processor begins operating under start-up conditions;
       a run state entered into from the startup state, and in which the fuel processor reforms the process feed stream into a reformate under steady-state conditions; and
       a shutdown state entered into any one of the manager check state, preheat state, startup state, and run state.

17. The fuel processor of claim 16, wherein the operational cycle further comprises at least one of:
    a manual state entered into from the off state, and into which an operator can direct operation of the overall system; and
    an emergency shutdown state entered into from any one of the manager check state, the startup state, and the run state.

18. The fuel processor of claim 16, wherein the off state comprises at least two of:
    displaying a message indicating the cause of the shutdown of a previous operational cycle;
    enabling the start of the operational cycle;
    transitioning to the manager check state; and
    transitioning to the manual state.

19. The fuel processor of claim 16, wherein the off state comprises at least two of:
    displaying a message indicating the cause of the shutdown of a previous operational cycle;
    enabling the start of the operational cycle; and
    transitioning to the manager check state.

20. The fuel processor of claim 16, wherein the manager check state comprises:
    checking the operational readiness of the constituent elements of the fuel processor;
    transitioning to the preheat state.

21. The fuel processor of claim 16, wherein the manager check state comprises:
    checking the operational readiness of the constituent elements of the fuel processor;
    reporting an error detected during the check; and
    transitioning to the shutdown state if the error is detected.

22. The fuel processor of claim 16, wherein the preheat state includes:
    providing air, water, and the fuel to an oxidizer;
    lighting off the oxidizer; and
    purging a reactor of a reformer.

23. The fuel processor of claim 22, wherein the preheat state further includes transitioning to the startup state.

24. The fuel processor of claim 22, wherein the preheat state further includes:
    detecting an error in the providing the air, water, and fuel, or in lighting of the oxidizer, or in purging the reactor; and
    transitioning to the shutdown state.

25. The fuel processor of claim 16, wherein the startup state includes:
    ramping production of a process feed stream; and
    reforming the process feed stream as the production thereof builds.

26. The fuel processor of claim 16, wherein the startup state further includes transitioning the to run state.

27. The fuel processor of claim 25, wherein the startup state further includes:
    detecting an error in ramping production of the process feed stream or in reforming the process feed stream; and
    transitioning to the shutdown state.

28. The fuel processor of claim 16, wherein the run state includes:
    generating a process feed stream;
    reforming the process feed stream; and
    transitioning to the shutdown state.

29. The fuel processor of claim 28, wherein the run state further includes detecting an error in generating the process feed stream or in reforming the process feed stream before transitioning to the shutdown state.

30. The fuel processor of claim 16, wherein the shutdown state includes:
  purging an oxidizer and a reformer; and
  cooling the purged oxidizer and reformer.
31. The fuel processor of claim 16, wherein the supply of fuel, air and water comprises:
  a fuel subsystem;
  an air subsystem; and
  a water subsystem.
32. The fuel processor of claim 16, wherein the oxidizer comprises an anode tailgas oxidizer.
33. The fuel processor of claim 16, wherein the reformer is an autothermal reformer.
34. A power plant, comprising:
  a fuel processor, comprising:
    a supply of fuel, air and water;
    an oxidizer receiving the fuel air and water and generating a process feed stream;
    a reformer reforming the process feed stream into a hydrogen-rich gas; and
    an automated control system directing the generation of the supply of fuel, air and water, generating the process feed stream, and reforming the process feed through an operational cycle, the operational cycle including:
      an off state;
      a manager check state entered into from the off state, and in which the operational readiness of the fuel processor is checked;
      a preheat state entered into from the manager check state, and in which the fuel processor preheats gases, including the fuel, for mixing into a process feed stream;
      a startup state entered into from the preheat state, and in which the fuel processor begins operating under start-up conditions;
      a run state entered into from the startup state, and in which the fuel processor reforms the process feed stream into a reformate under steady-state conditions; and
      a shutdown state entered into any one of the manager check state, preheat state, startup state, and run state; and
  a fuel cell receiving the hydrogen-rich gas.
35. The power plant of claim 34, wherein the operational cycle further comprises at least one of:
  a manual state entered into from the off state, and into which an operator can direct operation of the overall system; and
  an emergency shutdown state entered into from any one of the manager check state, the startup state, and the run state.
36. The power plant of claim 34, wherein the off state comprises at least two of:
  displaying a message indicating the cause of the shutdown of a previous operational cycle;
  enabling the start of the operational cycle;
  transitioning to the manager check state; and
  transitioning to the manual state.
37. The power plant of claim 34, wherein the off state comprises at least two of:
  displaying a message indicating the cause of the shutdown of a previous operational cycle;
  enabling the start of the operational cycle; and
  transitioning to the manager check state.
38. The power plant of claim 34, wherein the manager check state comprises:
  checking the operational readiness of the constituent elements of the fuel processor;
  transitioning to the preheat state.
39. The power plant of claim 34, wherein the manager check state comprises:
  checking the operational readiness of the constituent elements of the fuel processor;
  reporting an error detected during the check; and
  transitioning to the shutdown state if the error is detected.
40. The power plant of claim 34, wherein the preheat state includes:
  providing air, water, and the fuel to an oxidizer;
  lighting off the oxidizer; and
  purging a reactor of a reformer.
41. The power plant of claim 40, wherein the preheat state further includes transitioning to the startup state.
42. The power plant of claim 40, wherein the preheat state further includes:
  detecting an error in the providing the air, water, and fuel, or in lighting of the oxidizer, or in purging the reactor; and
  transitioning to the shutdown state.
43. The power plant of claim 34, wherein the startup state includes:
  ramping production of a process feed stream; and
  reforming the process feed stream as the production thereof builds.
44. The power plant of claim 34, wherein the startup state further includes transitioning the to run state.
45. The power plant of claim 43, wherein the startup state further includes:
  detecting an error in ramping production of the process feed stream or in reforming the process feed stream; and
  transitioning to the shutdown state.
46. The power plant of claim 34, wherein the run state includes:
  generating a process feed stream;
  reforming the process feed stream; and
  transitioning to the shutdown state.
47. The power plant of claim 46, wherein the run state further includes detecting an error in generating the process feed stream or in reforming the process feed stream before transitioning to the shutdown state.
48. The power plant of claim 34, wherein the shutdown state includes:
  purging an oxidizer and a reformer; and
  cooling the purged oxidizer and reformer.
49. The power plant of claim 34, wherein the supply of fuel, air and water comprises:
  a fuel subsystem;
  an air subsystem; and
  a water subsystem.
50. The power plant of claim 34, wherein the oxidizer comprises an anode tailgas oxidizer.
51. The power plant of claim 34, wherein the reformer is an autothermal reformer.
52. The power plant of claim 34, wherein fuel cell comprises a proton exchange membrane fuel cell.

53. A method for operating a fuel processor, comprising:

transitioning from an off state to a manager check state in which the operational readiness of the fuel processor is checked;

transitioning from the manager check state to a preheat state in which the fuel processor preheats gases, including the fuel, for mixing into a process feed stream;

transitioning from the preheat state to a startup state in which the fuel processor begins operating under startup conditions;

transitioning from the startup state to a run state in which the fuel processor reforms the process feed stream into a reformate under steady-state conditions; and transitioning from any one of the manager check state, the preheat state, the startup sate, and the run state into a shutdown state.

54. The method of claim 53, further comprising at least one of:

transitioning to a manual state from the off state, and into which an operator can direct operation of the overall system; and transitioning to an emergency shutdown state from any one of the manager check state, the startup state, and the run state.

55. The method of claim 53, wherein the off state comprises at least two of:

displaying a message indicating the cause of the shutdown of a previous operational cycle;

enabling the start of the operational cycle;

transitioning to the manager check state; and transitioning to the manual state.

56. The method of claim 53, wherein the off state comprises at least two of:

displaying a message indicating the cause of the shutdown of a previous operational cycle;

enabling the start of the operational cycle; and transitioning to the manager check state.

57. The method of claim 53, wherein the manager check state comprises:

checking the operational readiness of the constituent elements of the fuel processor;

transitioning to the preheat state.

58. The method of claim 53, wherein the manager check state comprises:

checking the operational readiness of the constituent elements of the-fuel processor;

reporting an error detected during the check; and transitioning to the shutdown state if the error is detected.

59. The method of claim 53, wherein the preheat state includes:

providing air, water, and the fuel to an oxidizer;

lighting off the oxidizer; and purging a reactor of a reformer.

60. The method of claim 59, wherein the preheat state further includes transitioning to the startup state.

61. The method of claim 59, wherein the preheat state further includes:

detecting an error in the providing the air, water, and fuel, or in lighting of the oxidizer, or in purging the reactor; and transitioning to the shutdown state.

62. The method of claim 53, wherein the startup state includes:

ramping production of a process feed stream; and reforming the process feed stream as the production thereof builds.

63. The method of claim 53, wherein the startup state further includes transitioning the to run state.

64. The method of claim 62, wherein the startup state further includes:

detecting an error in ramping production of the process feed stream or in reforming the process feed stream; and transitioning to the shutdown state.

65. The method of claim 53, wherein the run state includes:

generating a process feed stream;

reforming the process feed stream; and transitioning to the shutdown state.

66. The method of claim 65, wherein the run state further includes detecting an error in generating the process feed stream or in reforming the process feed stream before transitioning to the shutdown state.

67. The method of claim 53, wherein the shutdown state includes:

purging an oxidizer and a reformer; and cooling the purged oxidizer and reformer.

* * * * *